US011233543B2

(12) United States Patent
Zhou et al.

(10) Patent No.: US 11,233,543 B2
(45) Date of Patent: *Jan. 25, 2022

(54) FEEDBACK OF BEAM REPETITION AND DIVERSITY MODE

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Sony Akkarakaran, Poway, CA (US); Xiao Feng Wang, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,192

(22) Filed: Jul. 29, 2020

(65) Prior Publication Data

US 2021/0013933 A1 Jan. 14, 2021

Related U.S. Application Data

(63) Continuation of application No. 16/257,652, filed on Jan. 25, 2019, now Pat. No. 10,756,784.

(Continued)

(51) Int. Cl.
*H04B 7/0408* (2017.01)
*H04B 7/06* (2006.01)
(Continued)

(52) U.S. Cl.
CPC ........ *H04B 7/0408* (2013.01); *H04B 7/0628* (2013.01); *H04B 7/0639* (2013.01);
(Continued)

(58) Field of Classification Search
CPC .. H04B 7/0408; H04B 7/0639; H04B 17/309; H04B 7/0628; H04B 7/0697;
(Continued)

(56) References Cited

U.S. PATENT DOCUMENTS

2014/0323143 A1 10/2014 Jung et al.
2014/0334566 A1 11/2014 Kim et al.
(Continued)

FOREIGN PATENT DOCUMENTS

WO WO2018045307 A1 3/2018

OTHER PUBLICATIONS

International Search Report and Written Opinion—PCT/US2019/021409 ISA/EPO—dated May 28, 2019.
(Continued)

*Primary Examiner* — Dac V Ha
(74) *Attorney, Agent, or Firm* — Holland & Hart LLP

(57) ABSTRACT

A user equipment (UE) may measure signal characteristics of a beam reference signal and determine, based on the measured signal characteristics, a beam repetition and diversity (R/D) mode to be used in communications between the UE and a base station. In some examples, UE feedback to the base station may include an indication of the determined beam R/D mode, as well as channel quality information associated with one or more beams to which the determined beam R/D mode is to be applied and/or operating parameters (e.g., a mixed beam repetition and diversity pattern) associated with the beam R/D mode.

30 Claims, 18 Drawing Sheets

Related U.S. Application Data

(60) Provisional application No. 62/651,931, filed on Apr. 3, 2018.

(51) Int. Cl.
*H04W 74/08* (2009.01)
*H04B 17/309* (2015.01)
*H04L 1/16* (2006.01)

(52) U.S. Cl.
CPC ......... *H04B 17/309* (2015.01); *H04L 1/1664* (2013.01); *H04W 74/0833* (2013.01)

(58) Field of Classification Search
CPC . H04B 7/088; H04B 7/0695; H04W 74/0833; H04L 1/1664
See application file for complete search history.

(56) References Cited

U.S. PATENT DOCUMENTS

| | | |
|---|---|---|
| 2018/0048442 A1 | 2/2018 | Sang et al. |
| 2018/0070343 A1 | 3/2018 | Chen et al. |
| 2018/0083680 A1 | 3/2018 | Guo et al. |
| 2019/0028253 A1 | 1/2019 | Ahn et al. |
| 2019/0104549 A1 | 4/2019 | Deng et al. |
| 2019/0182821 A1* | 6/2019 | You ................ H04W 72/042 |
| 2019/0215888 A1 | 7/2019 | Cirik et al. |
| 2019/0222283 A1 | 7/2019 | Yum et al. |
| 2019/0246388 A1* | 8/2019 | Seo ................. H04W 72/046 |
| 2019/0305830 A1 | 10/2019 | Zhou et al. |
| 2021/0036822 A1* | 2/2021 | Lyu .................... H04L 5/006 |

OTHER PUBLICATIONS

Zte, et al., "Considerations on SS Burst Design", 3GPP TSG RAN WG1 Meeting #87, 3GPP Draft; R1-1611269, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), 5 Pages, XP051175250, Retrieved from the Internet: URL: http://www.3gpp.org/ftp/Meetings_3GPP_SYNC/RAN1/Docs/[retrieved on Nov. 13, 2016] sections 2 and 3; p. 2-p. 3.

* cited by examiner

FEEDBACK OF BEAM REPETITION AND DIVERSITY MODE

CROSS REFERENCES

The present Application for Patent is a Continuation of U.S. patent application Ser. No. 16/257,652 by ZHOU et al., entitled "FEEDBACK OF BEAM REPETITION AND DIVERSITY MODE" filed Jan. 25, 2019, which claims the benefit of U.S. Provisional Patent Application No. 62/651,931 by ZHOU et al., entitled "FEEDBACK OF BEAM REPETITION AND DIVERSITY MODE," filed Apr. 3, 2018, assigned to the assignee hereof, and expressly incorporated by reference herein.

BACKGROUND

The following relates generally to wireless communications, and more specifically to feedback of a beam repetition and diversity mode.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless devices (e.g., base stations, UEs, etc.) may use beams or beamformed signals for transmission and/or reception of wireless communications. For example, a base station may utilize beamformed transmissions to mitigate path losses associated with high frequency communications. The base station may send a message using a downlink transmission beam, and the UE may receive the transmission using a downlink reception beam. In some cases, a UE may include multiple antennas, and may receive beam reference signal transmissions from a base station using various antenna configurations in order to determine transmission and/or reception beams for future communications, as well as corresponding antenna configurations. Further, the UE may send beam information (e.g., determined from the beam reference signal received from the base station) in a beam management report to the base station. The information sent by the UE to the base station may allow the base station to not only determine downlink transmission beams and/or uplink reception beams, but to also determine other beam-related parameters. In some cases, however, these beam management reports may be relatively infrequent, and may only include feedback information for a select number of beams. Improved techniques for UE feedback may thus be desired.

SUMMARY

The described techniques relate to improved methods, systems, devices, and apparatuses that support feedback of a beam repetition and diversity (R/D) mode. A user equipment (UE) may measure signal characteristics of a beam reference signal (RS) and determine, based on the measured signal characteristics, a beam R/D mode to be used in communications between the UE and a base station. For example, a UE may measure reference signal characteristics such as signal receive power (RSRP), signal-to-interference plus noise (SINR), etc. of one or more received beam RSs from a base station. Based on the measured signal characteristics, the UE may determine a beam R/D mode (e.g., the UE may determine suitable beam repetition techniques, beam diversity techniques, or both, based on the signal characteristics associated with RSs received from a base station transmitted via downlink transmit beams).

In some examples, UE feedback to the base station may include an indication of the determined beam R/D mode. Additionally, the indication of the determined beam R/D mode may further include channel quality information (e.g., RSRP/SINR statistics) associated with one or more beams to which the determined beam R/D mode is to be applied, operating parameters (e.g., a number of beam repetitions for beam repetition techniques, beam indices for beam diversity techniques, a mixed beam R/D pattern, etc.) associated with the beam R/D mode, etc. In some cases, radio resource control (RRC) signaling may configure periodic or semi-persistent reporting of UE feedback. Additionally or alternatively, the UE may report the beam R/D feedback in response to a request, or may autonomously transmit UE feedback upon detection of certain UE feedback reporting criteria. UE feedback reporting criteria may include identifying that a duration of time since a previous beam management report has been transmitted exceeds a threshold (e.g., identifying the base station may have insufficient channel quality information for downlink transmit beams), identifying a preferred beam R/D mode for a beam associated with the beam reference signal (e.g., identifying a new candidate beam, for example, due to a beam failure RS), etc.

A method of wireless communication at a UE is described. The method may include measuring, at the UE, one or more signal characteristics of a beam reference signal, and determining, at the UE, a beam repetition and diversity mode to be used in communications between the UE and a base station based on the one or more measured signal characteristics. The method may further include transmitting an indication of the determined beam repetition and diversity mode to the base station.

An apparatus for wireless communication at a UE is described. The apparatus may include a processor, memory in electronic communication with the processor, and instructions stored in the memory. The instructions may be executable by the processor to cause the apparatus to measure, at the apparatus, one or more signal characteristics of a beam reference signal, and determining, at the apparatus, a beam repetition and diversity mode to be used in communications between the apparatus and a base station based on the one or more measured signal characteristics. The instructions may be further executable by the processor to cause the apparatus to transmit an indication of the determined beam repetition and diversity mode to the base station.

Another apparatus for wireless communication at a UE is described. The apparatus may include measuring, at the apparatus, one or more signal characteristics of a beam reference signal, determining, at the apparatus, a beam repetition and diversity mode to be used in communications between the apparatus and a base station based on the one or more measured signal characteristics, and transmitting an indication of the determined beam repetition and diversity mode to the base station.

A non-transitory computer-readable medium storing code for wireless communication at a UE is described. The code may include instructions executable by a processor to measure, at the UE, one or more signal characteristics of a beam reference signal, determine, at the UE, a beam repetition and diversity mode to be used in communications between the UE and a base station based on the one or more measured signal characteristics, and transmitting an indication of the determined beam repetition and diversity mode to the base station.

Some examples of the method, apparatuses, and non-transitory computer-readable medium described herein may further include operations, features, means, or instructions for transmitting, with the indication of the determined beam repetition and diversity mode, an identification of one or more beams to which the determined beam repetition and diversity mode may be to be applied.

In some examples of the method, apparatuses, and non-transitory computer-readable medium described herein, transmitting the indication of the determined beam repetition and diversity mode may include operations, features, means, or instructions for including the indication of the determined beam repetition and diversity mode in a beam management report and transmitting the beam management report to the base station.

Some examples of the method, apparatuses, and non-transitory computer-readable medium described herein may further include operations, features, means, or instructions for transmitting, with the indication of the determined beam repetition and diversity mode, channel quality information associated with each of one or more beams to which the determined beam repetition and diversity mode may be to be applied, operating parameters associated with the beam repetition and diversity mode, or some combination thereof.

In some examples of the method, apparatuses, and non-transitory computer-readable medium described herein, the operating parameters include a number of beam repetitions for each of the one or more beams, beam indices associated with the one or more beams, a transmissions order associated with the one or more beams, a mixed beam repetition and diversity pattern, or some combination thereof.

Some examples of the method, apparatuses, and non-transitory computer-readable medium described herein may further include operations, features, means, or instructions for determining the operating parameters associated with the beam repetition and diversity mode based on the measured one or more signal characteristics of the beam reference signal.

In some examples of the method, apparatuses, and non-transitory computer-readable medium described herein, transmitting the indication of the determined beam repetition and diversity mode may include operations, features, means, or instructions for including the indication of the determined beam repetition and diversity mode in a beam failure recovery (BFR) request, where the determined beam repetition and diversity mode may be associated with a candidate beam in a BFR procedure and transmitting the BFR request to the base station.

Some examples of the method, apparatuses, and non-transitory computer-readable medium described herein may further include operations, features, means, or instructions for receiving a RRC message allocating resources for periodic or semi-persistent reporting of the indication of the beam repetition and diversity mode reporting. Some examples of the method, apparatuses, and non-transitory computer-readable medium described herein may further include operations, features, means, or instructions for receiving a media access control (MAC) control element (CE), activating the periodic or semi-persistent reporting of the indication of the beam repetition and diversity mode.

Some examples of the method, apparatuses, and non-transitory computer-readable medium described herein may further include operations, features, means, or instructions for receiving, from the base station, a request that the indication of the determined beam repetition and diversity mode be transmitted to the base station. In some examples of the method, apparatuses, and non-transitory computer-readable medium described herein, the request may be received in DCI.

In some examples of the method, apparatuses, and non-transitory computer-readable medium described herein, transmitting the indication of the determined beam repetition and diversity mode further may include operations, features, means, or instructions for identifying, at the UE, that a beam repetition and diversity mode reporting criteria may be satisfied and transmitting the indication of the determined beam repetition and diversity mode based on the beam repetition and diversity mode reporting criteria being satisfied.

Some examples of the method, apparatuses, and non-transitory computer-readable medium described herein may further include operations, features, means, or instructions for identifying the beam repetition and diversity mode reporting criteria may be satisfied includes identifying that a duration of time since a previous beam management report may have been transmitted exceeds a threshold, identifying a second beam repetition and diversity mode for a beam associated with the beam reference signal, or some combination thereof.

In some examples of the method, apparatuses, and non-transitory computer-readable medium described herein, transmitting the indication of the determined beam repetition and diversity mode to the base station may include operations, features, means, or instructions for transmitting the indication on a dedicated resource or piggybacked with a periodic, semi-persistent, or aperiodic beam management report.

In some examples of the method, apparatuses, and non-transitory computer-readable medium described herein, transmitting the indication of the determined beam repetition and diversity mode to the base station may include operations, features, means, or instructions for transmitting the indication piggybacked with uplink data or included in a dedicated uplink frame scheduled by an uplink grant triggered by a scheduling request.

In some examples of the method, apparatuses, and non-transitory computer-readable medium described herein, transmitting the indication of the determined beam repetition and diversity mode to the base station may include operations, features, means, or instructions for selecting random access channel (RACH) resources or a RACH preamble based on the determined beam repetition and diversity mode and transmitting an uplink message to the base station that includes at least one of the selected RACH resources or RACH preamble as the indication.

Some examples of the method, apparatuses, and non-transitory computer-readable medium described herein may further include operations, features, means, or instructions for receiving, from the base station, a request for additional information relating to the determined beam repetition and diversity mode and transmitting, in response to the request, channel quality information associated with each of one or more beams to which the determined beam repetition and diversity mode may be to be applied, operating parameters associated with the beam repetition and diversity mode, or some combination thereof.

In some examples of the method, apparatuses, and non-transitory computer-readable medium described herein, determining the beam repetition and diversity mode may include operations, features, means, or instructions for selecting from a beam repetition mode, a beam diversity mode, a mixed beam repetition and diversity mode, or a no beam repetition and diversity mode, and where the indication of the determined beam repetition and diversity mode includes a 2-bit indicator that indicates the selected beam repetition and diversity mode.

A method of wireless communication at a base station is described. The method may include receiving, from a UE, an indication of a beam repetition and diversity mode to be used in communications between the UE and the base station and communicating with the UE based on the received indication.

An apparatus for wireless communication at a base station is described. The apparatus may include a processor, memory in electronic communication with the processor, and instructions stored in the memory. The instructions may be executable by the processor to cause the apparatus to receive, from a UE, an indication of a beam repetition and diversity mode to be used in communications between the UE and the base station and communicating with the UE based on the received indication.

Another apparatus for wireless communication at a base station is described. The apparatus may include receiving, from a UE, an indication of a beam repetition and diversity mode to be used in communications between the UE and the base station and communicating with the UE based on the received indication.

A non-transitory computer-readable medium storing code for wireless communication at a base station is described. The code may include instructions executable by a processor to receive, from a UE, an indication of a beam repetition and diversity mode to be used in communications between the UE and the base station and communicating with the UE based on the received indication.

Some examples of the method, apparatuses, and non-transitory computer-readable medium described herein may further include operations, features, means, or instructions for receiving, with the indication of the beam repetition and diversity mode, an identification of one or more beams to which the beam repetition and diversity mode may be to be applied.

In some examples of the method, apparatuses, and non-transitory computer-readable medium described herein, receiving the indication of the beam repetition and diversity mode may include operations, features, means, or instructions for receiving the indication of the beam repetition and diversity mode in a beam management report.

Some examples of the method, apparatuses, and non-transitory computer-readable medium described herein may further include operations, features, means, or instructions for receiving, with the indication of the beam repetition and diversity mode, channel quality information associated with each of one or more beams to which the beam repetition and diversity mode may be to be applied, operating parameters associated with the beam repetition and diversity mode, or some combination thereof.

In some examples of the method, apparatuses, and non-transitory computer-readable medium described herein, the operating parameters include a number of beam repetitions for each of the one or more beams, beam indices associated with the one or more beams, a transmissions order associated with the one or more beams, a mixed beam repetition and diversity pattern, or some combination thereof.

In some examples of the method, apparatuses, and non-transitory computer-readable medium described herein, receiving the indication of the beam repetition and diversity mode may include operations, features, means, or instructions for receiving the indication of the beam repetition and diversity mode in a BFR request, where the beam repetition and diversity mode may be associated with a candidate beam in a BFR procedure.

Some examples of the method, apparatuses, and non-transitory computer-readable medium described herein may further include operations, features, means, or instructions for transmitting a RRC message allocating resources for periodic or semi-persistent reporting of the indication of the beam repetition and diversity mode reporting. Some examples of the method, apparatuses, and non-transitory computer-readable medium described herein may further include operations, features, means, or instructions for transmitting a MAC CE, activating the periodic or semi-persistent reporting of the indication of the beam repetition and diversity mode.

Some examples of the method, apparatuses, and non-transitory computer-readable medium described herein may further include operations, features, means, or instructions for transmitting a request that the indication of the beam repetition and diversity mode be transmitted from the UE. In some examples of the method, apparatuses, and non-transitory computer-readable medium described herein, the request may be transmitted in DCI.

In some examples of the method, apparatuses, and non-transitory computer-readable medium described herein, receiving the indication of the beam repetition and diversity mode to the base station may include operations, features, means, or instructions for receiving the indication on a dedicated resource or piggybacked with a periodic, semi-persistent, or aperiodic beam management report from the UE.

In some examples of the method, apparatuses, and non-transitory computer-readable medium described herein, receiving the indication of the beam repetition and diversity mode may include operations, features, means, or instructions for receiving, from the UE, the indication piggybacked with uplink data or included in a dedicated uplink frame scheduled by an uplink grant triggered by a scheduling request.

In some examples of the method, apparatuses, and non-transitory computer-readable medium described herein, receiving the indication of the beam repetition and diversity mode may include operations, features, means, or instructions for receiving an uplink message from the UE that includes at least one of a RACH resource or a RACH preamble as the indication.

Some examples of the method, apparatuses, and non-transitory computer-readable medium described herein may further include operations, features, means, or instructions for transmitting, to the UE, a request for additional information relating to the beam repetition and diversity mode and receiving, in response to the request, channel quality information associated with each of one or more beams to which the beam repetition and diversity mode may be to be applied, operating parameters associated with the beam repetition and diversity mode, or some combination thereof.

DETAILED DESCRIPTION

Figure 1:
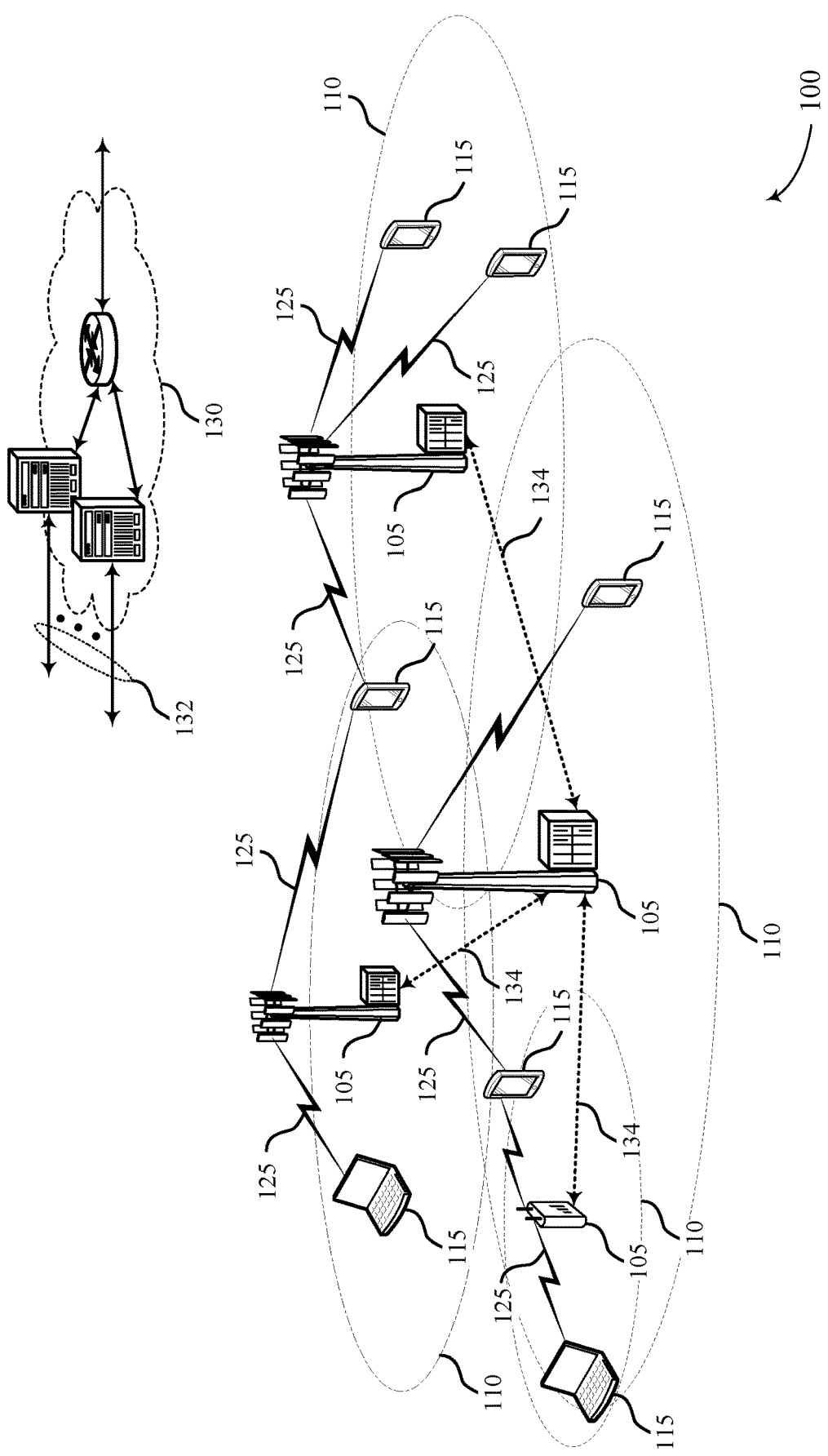
FIG. 1 illustrates an example of a wireless communications system that supports feedback of a beam reception and diversity (R/D) mode in accordance with aspects of the present disclosure.

Wireless devices (e.g., base stations, user equipment (UEs), etc.) may use beams or beamformed signals for transmission and/or reception of wireless communications. For example, a base station may utilize beamformed transmissions to mitigate path losses associated with high frequency communications. Wireless devices may thus use directional transmit beams to transmit signals, and may use certain antenna configurations or receive beams to receive signals. In some cases, a base station and a UE may communicate using beam repetition techniques, beam diversity techniques, or both (e.g., a base station and a UE may operate or communicate according to a beam receive and diversity (R/D) mode). Beam diversity may include transmitting iterations of a signal (e.g., repeated information) on multiple beams. For example, a base station may transmit downlink information repeated over two transmissions, where each transmission utilizes a different downlink transmit beam. If a downlink transmit beam corresponding to one of the transmissions experiences interference, a receiving device (e.g., a UE) may still receive the downlink information via another beam (e.g., such as the second beam used to transmit the repeated downlink information). That is, wireless devices may transmit signals (e.g., with repeated information) on different transmit beam combinations for signaling diversity, which may improve robustness (e.g., by reducing communication degradation arising from interference on certain beams). Additionally or alternatively, wireless devices may improve beamformed communication robustness by utilizing beam repetition techniques (e.g., transmitting multiple iterations of a signal using different transmissions on a same beam). Using multiple transmissions to transmit multiple signals (e.g., with repeated information) using a transmit beam may increase the power of the beam at a receiving device (e.g., at a UE).

Different combinations of beam repetition techniques and beam diversity techniques may be referred to as beam R/D modes. In one example, a beam R/D mode may indicate that no beam repetition or diversity is to be applied. In another example, a beam R/D mode may indicate that only beam repetition is to be applied. A further example of a beam R/D mode may indicate that only beam diversity is to be applied. A combination of both beam repetition and diversity may be indicated by yet another beam R/D mode. Information bits (e.g., such as downlink control information (DCI) in physical downlink control channel (PDCCH) transmissions, data information such as transport blocks (TBs) in physical downlink shared channel (PDSCH) transmissions, etc.) may be transmitted according to these different beam R/D modes. For example, information bits may be transmitted and retransmitted across more than one transmit beam (e.g., according to beam diversity techniques), transmitted more than once on a single transmit beam (e.g., according to beam repetition techniques), or both, as described herein.

In some cases, a base station may determine a beam R/D mode for communications with a UE. Beam R/D modes may be determined based on reference signal received power (RSRP) or signal-to-interference plus noise ratio (SINR) statistics of different beams (e.g., per-beam RSRP/SINR statistics). For example, the base station may learn or determine RSRP/SINR statistics of different downlink transmit beams via periodic UE beam management (BM) reports received from a UE. To refine downlink transmit beams for transmission of control or data information, the base station may periodically transmit reference signals (RSs) (e.g., such as synchronization signal block (SSB)/channel state information reference signal (CSI-RS)) using different downlink transmit beams (e.g., every 20 ms or 40 ms). UEs may report measured RSRP (e.g., layer 1 RSRP (L1-RSRP)) of the top N beams (e.g., a UE may report the RSRP for each of the N beams with the best RSRP statistics). Based on the UE BM report, the base station may select a suitable downlink transmit beam for downlink control/data transmission. The base station may also select an appropriate beam R/D mode.

However, in some examples, the base station may have limited knowledge (e.g., limited information) regarding RSRP/SINR statistics for downlink transmit beams due to limited BM reports (e.g., BM reports may be infrequent, and include limited information only for certain reported beams), which may result in inefficient beam R/D mode determinations. For example, a base station may not have corresponding RSRP statistics when a UE reports a new beam (e.g., or a beam not reported for a long time) in a BM report. When a new beam is reported in a BM report, the base station may not have prior information corresponding to the newly reported beam to identify averages or variations of RSRP associated with the new beam (e.g., which may be useful to determine if beam repetition or beam diversity techniques should be employed). For example, a high RSRP may be reported due to fading, which may not be representative of the beam conditions over time. Additionally, BM reports may not include per beam interference or SINR information (e.g., to reduce overhead associated with BM reports). The base station may thus not have information regarding SINR variation of beams reported in the BM report (e.g., which may be useful for the base station to determine if beam diversity techniques should be employed). Further, RSRP/SINR statistics of selected beams may change or vary over time (e.g., between two BM reports), for example, due to bursty interference. Due to the relatively infrequent nature of BM reports, the base station may not be able to detect such issues efficiently. Beam quality variations between BM reports may be more exaggerated for control beams, as neither fast channel quality indicator (CQI) report, rate adaptation, uplink acknowledgements/negative acknowledgments, and hybrid automatic repeat request (HARQ) retransmissions may be associated with such control information. Accordingly, more accurate and timely decisions on beam R/D modes may be desired.

According to the techniques described herein, UEs may determine beam R/D modes and report UE feedback of beam R/D modes to a base station. For example, a UE may store RSRP/SINR statistics of different downlink transmit beams (e.g., determined from measured RSs received from a base station via the different downlink transmit beams). The UE may use these RSRP/SINR statistics to make more accurate and timely decisions on beam R/D mode per reported beams (e.g., beam R/D modes associated with reported uplink/downlink transmit beams). For example, for each reported beam in a BM report, the UE may indicate if beam repetition techniques and/or beam diversity techniques are desirable based on corresponding RSRP/SINR statistics in previous BM measurements. That is, the UE may use information that may not be reported (e.g., information such as SINR statistics, more frequent and recent RSRP/SINR statistics, such as statistics associated with beam failure RSs or demodulation reference signals (DMRS), RSRP/SINR statistics corresponding to new candidate beams or beams not included in a prior BM reports, etc.) to determine more accurate and timely beam R/D modes. In some examples, UE feedback may be transmitted more frequently than BM reports. Additionally or alternatively, UEs may autonomously transmit UE feedback upon identification of UE feedback reporting criteria. Beneficially, the techniques described may provide for more efficient use of beam R/D modes, may reduce beam failures, and increase overall system performance.

Aspects of the disclosure are initially described in the context of a wireless communications system. An example process flow diagram for implementation of techniques discussed herein is then described. Aspects of the disclosure are further illustrated by and described with reference to apparatus diagrams, system diagrams, and flowcharts that relate to feedback of beam R/D mode.

FIG. 1 illustrates an example of a wireless communications system 100 that supports feedback of beam R/D mode in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions). In some cases, a base station 105 may transmit an indication to a UE of the quasi co-located (QCL) relationships between antenna ports used for downlink communications with the UE. Such an indication may be referred to as a transmission configuration indication (TCI). Different TCI-states may correspond to different QCL relationships between antenna ports used for downlink communication with a UE. For example, a TCI-state may indicate a QCL relationship between a reference signal resource (e.g., a tracking reference signal (TRS), a SSB, a CSI-RS, etc.) and a UE target reference signal (e.g., DMRS). QCL relationships between antenna ports used for communications between a base station 105 and a UE 115 may improve the chances that a device receiving the communications may be able to successfully decode and process the communications.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may measure signal characteristics of beam RSs (e.g., transmitted by a base station 105) and determine, based on the measured signal characteristics, a beam R/D mode to be used in communications between the UE 115 and the base station 105. In some examples, UE feedback (e.g., feedback from the UE 115) to the base station 105 may include an indication of the determined beam R/D mode (e.g., a 2-bit beam R/D mode indicator), and may further include channel quality information associated with one or more beams to which the determined beam R/D mode is to be applied and/or operating parameters (e.g., a mixed beam R/D pattern) associated with the beam R/D mode. RRC may configure periodic or semi-persistent reporting of UE feedback. Alternatively, the UE 115 may respond when polled by a base station, or may autonomously transmit UE feedback (e.g., upon detection of certain UE feedback reporting criteria). The UE 115 may transmit an indication of the determined beam R/D mode (e.g., via UE feedback) to the base station 105.

Figure 2A:
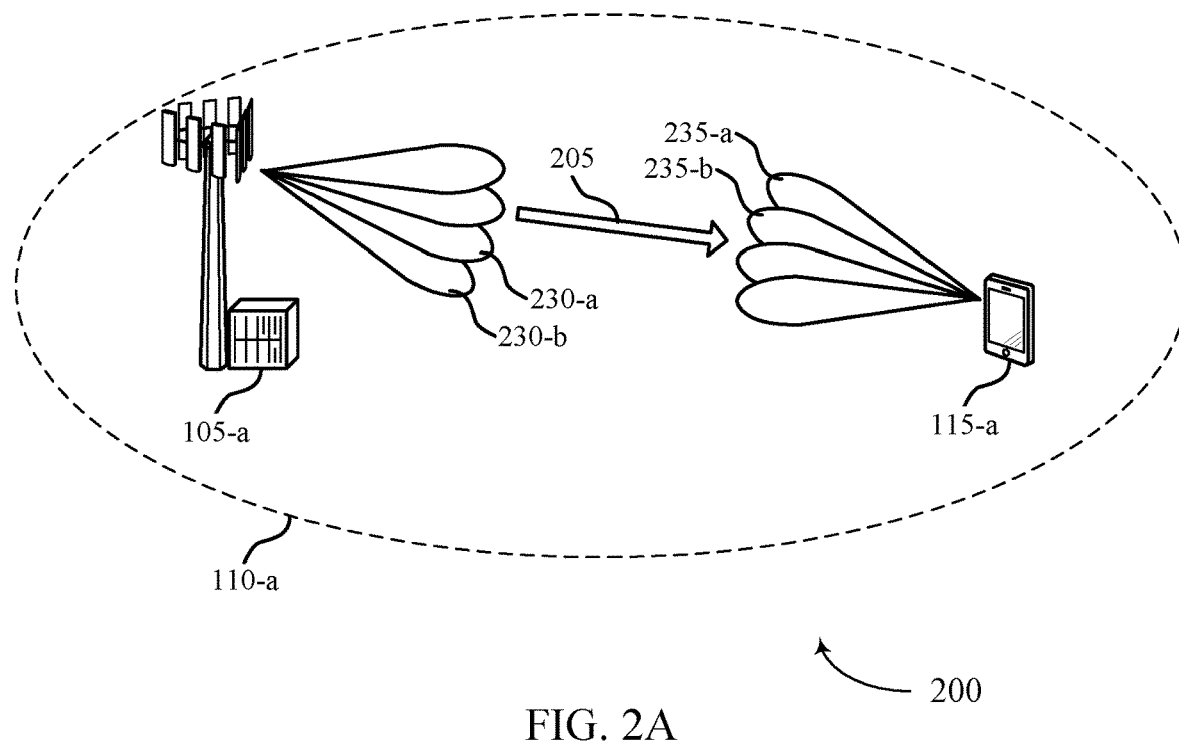
FIGS. 2A & 2B illustrates an example of a wireless communications system that supports feedback of a beam R/D mode in accordance with aspects of the present disclosure.

FIG. 2A illustrates an example of a wireless communication system 200 that supports feedback of a beam R/D mode in accordance with various aspects of the present disclosure. The wireless communication system 200 may include base station 105-a and UE 115-a, which may be examples of a base station 105 and a UE 115, as described with reference to FIG. 1. Base station 105-a may provide network coverage for geographic area 110-a. Base station 105-a and UE 115-a may communicate using beam-formed or directional transmissions. For example, in downlink communications, base station 105-a may transmit downlink transmissions to UE 115-a using downlink transmission beams 230, and UE 115-a may receive the downlink transmissions using downlink reception beams 235. In the present example, base station 105-a may transmit beam RSs 205 to UE 115-a (e.g., via downlink transmission beams 230-a and 230-b), and UE 115-a may measure signal characteristics of the beam RSs 205 (e.g., via downlink reception beams 235-a and 235-b).

Figure 2B:
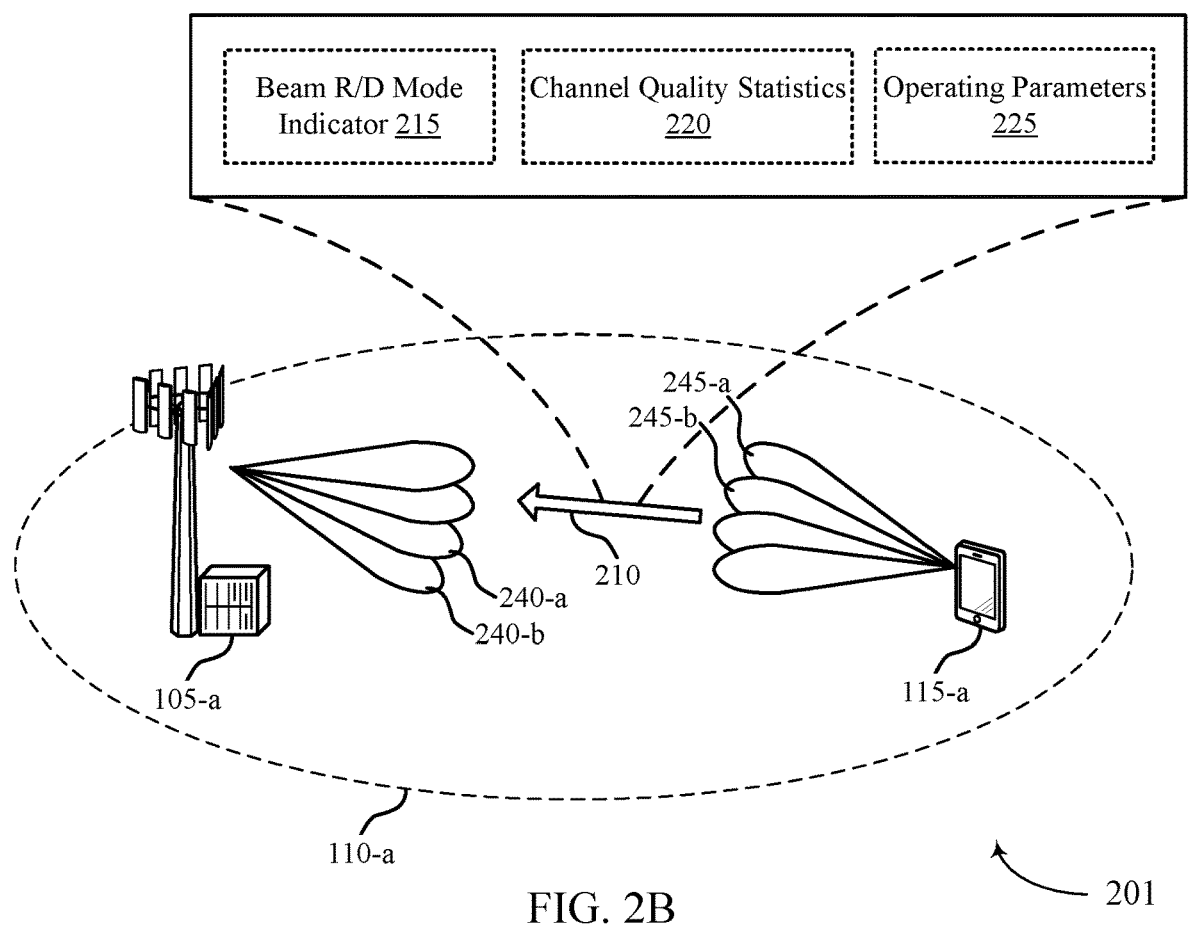

FIG. 2B illustrates an example of a wireless communication system 201 that supports feedback of a beam R/D mode in accordance with various aspects of the present disclosure. FIG. 2B may illustrate uplink communications, where UE 115-a may send uplink transmissions to base station 105-a using uplink transmission beams 245, and base station 105-a may receive the uplink transmissions using uplink reception beams 240. In the present example, UE 115-a may transmit beam feedback 210 (e.g., information relating to signal characteristics measured from beam RSs 205) to base station 105-a (e.g., using uplink transmission beams 245-a and 245-b), and base station 105-a may receive beam feedback 210 (e.g., using uplink reception beams 240-a and 240-b). In some cases, beam feedback 210 may include beam R/D mode information, such as a beam R/D mode indicator 215, channel quality statistics 220, and/or operating parameters 225.

In some cases, UE 115-a and base station 105-a may communicate using beam repetition techniques, beam diversity techniques, or both (e.g., a UE 115-a and/or a base station 105-a may operate or communicate according to a beam R/D mode). Wireless devices such as UE 115-a and base station 105-a may obtain beam diversity based on transmitting iterations of a signal on multiple beams. For example, either base station 105-a or UE 115-a may transmit a signal individually on two or more transmission beams. Thus, and for example, base station 105-a may transmit a signal on two or more downlink transmission beams 230-a, 230-b. In another example, UE 115-a may transmit a signal on two or more uplink transmission beams 245-a, 245-b. If a beam corresponding to one of the transmitted beams experiences interference (e.g., if uplink transmission beam 245-a experiences interference), base station 105-a may still receive the transmitted message via another beam (e.g., such as on uplink transmission beam 245-b). That is, wireless devices may transmit signals on different transmit beam combinations for signaling diversity, which may improve robustness (e.g., by reducing communication degradation arising from interference on certain beams). Further, wireless devices such as UE 115-a and base station 105-a may further improve beamformed communication robustness by utilizing beam repetition techniques (e.g., transmitting multiple iterations of a signal on a same beam). For example, base station 105-a may transmit a first instance of a signal on downlink transmission beam 230-a, and may additionally transmit a second instance of the signal on downlink transmission beam 230-a. In another example, UE 115-a may transmit a first instance of a signal on uplink transmission beam 245-a, and may additionally transmit a second instance of the signal on uplink transmission beam 245-a.

Combinations of beam repetition techniques and beam diversity techniques may be referred to as beam R/D modes. Information bits (e.g., such as downlink control information (DCI) in physical downlink control channel (PDCCH) transmissions, data information such as transport blocks (TBs) in physical downlink shared channel (PDSCH) transmissions, etc.) may be transmitted according to these different beam R/D modes. For example, information bits may be transmitted across more than one transmit beam (e.g., according to beam diversity techniques), transmitted more than once on a transmit beam (e.g., according to beam repetition techniques), or both.

A first beam R/D mode (e.g., beam repetition mode) may refer to an operation mode or communication mode in which the same information bits are repeated in different transmissions using a same transmit beam (e.g., the transmit beam is QCL with a same SSB/CSI-RS resource ID (e.g., the QCL information may be used to identify the transmit beam used for beam repetition). A beam repetition mode may improve wireless communications (e.g., improve cell coverage) when average RSRP/SINR is low at a receiving device (e.g., at UE 115-a or base station 105-a) due to large path loss. For example, UE 115-a may transmit multiple iterations or multiple transmissions of the same information bits on uplink transmit beam 245-a for beam repetition (e.g., which may result in higher received energy at a receiving device, base station 105-a). In another example, base station 105-a may transmit multiple iterations or multiple transmissions of the same information bits on downlink transmit beam 230-a for beam repetition (e.g., which may result in higher received energy at a receiving device, UE 115-a).

A second beam R/D mode (e.g., a beam diversity mode) may refer to an operation mode or communication mode in which the same information bits are repeated in different transmissions using different transmit beams (e.g., different transmit beams that are QCLed with different SSB/CSI-RS resource IDs. A beam diversity mode may provide diversity when instantaneous RSRP/SINR varies largely between different transmit beams (e.g., when instantaneous RSRP/SINR per transmit beam has large variation at UE 115-a) due to, for example, blockage (e.g., from buildings, moving objects, etc.), fast fading, bursty interference, etc. For example, UE 115-a may transmit the same information bits using transmissions on different uplink transmit beams 245 (e.g., UE 115-a may transmit information bits on uplink transmit beam 245-a in a first transmission and may transmit the same information bits on uplink transmit beam 245-b in a second transmission) for beam diversity. In another example, base station 105-a may transmit the same information bits on downlink transmit beam 230-a in a first transmission and may transmit the same information bits on downlink transmit beam 230-b in a second transmission.

A third beam R/D mode (e.g., a mixed beam repetition and diversity mode) may refer to an operation mode or communication mode in which the same information bits are repeated across different transmit beams for multiple cycles, or in which the same information bits are repeated on a first transmit beam some X number of times, then repeated on a second transmit beam from another X number of times, and so on. For example, in the first case, UE 115-a may transmit information bits on uplink transmit beam 245-a and transmit repeated information bits on uplink transmit beam 245-b (e.g., as a first cycle), then transmit repeated information bits again on uplink transmit beam 245-a and transmit repeated information bits again on uplink transmit beam 245-b (e.g., as a second cycle cycle), etc. That is, UE 115-a may transmit the same information bits in a beam sweeping manner across some number of uplink transmit beams 245 (e.g., to achieve beam diversity), and may repeat the beam sweep for some number of cycles (e.g., to achieve beam repetition on each beam of the beam sweeping pattern). In the second case described herein, UE 115-a may repeat transmission of information bits on a same uplink transmit beam (e.g., uplink transmit beam 245-a) X times, then may transmit the same information bits on a second uplink transmit beam (e.g., uplink transmit beam 245-b) another X times, moving through each beam of the configuration in this manner, where the information bits are transmitted on each beam X times before moving to the next transmit beam. Similar schemes may be used by base station 105-a in its own transmissions. Such a mixed beam repetition and diversity mode may provide for both coverage enhancement and improved diversity. In some cases in a mixed beam repetition and diversity mode, the information may be transmitted a different number of times on different uplink transmit beams. For example, UE 115-a may repeat transmission of information bits on a same uplink transmit beam (e.g., uplink transmit beam 245-a) X times, then may transmit the same information bits on a second uplink transmit beam (e.g., uplink transmit beam 245-b) Y times, where X and Y are different. Similar schemes may be used by base station 105-a in its own transmissions.

A fourth beam R/D mode (e.g., no beam repetition or beam diversity, or normal operation mode) may refer to an operation mode or communication mode in which information bits are associated with a single transmission on one transmit beam. That is, normal operation mode may not employ beam repetition or beam diversity techniques.

In some cases, a base station (e.g., base station 105-a) may determine a beam R/D mode for communications with UEs 115. Beam R/D modes may be determined based on RSRP/SINR statistics of different beams (e.g., per-beam RSRP/SINR statistics). For example, the base station 105-a may learn or determine RSRP/SINR statistics of different downlink transmit beams 230 via periodic UE BM reports from UE 115-a. To refine control or data downlink transmit beams 230, base station 105-a may periodically transmit SSB/CSI-RS using different downlink transmit beams 230

(e.g., every 20 ms or 40 ms). UE 115-a may report measured layer 1 (L1)-RSRP of the top N beams (e.g., UE 115-a may report the L1-RSRP for each of the top N beams, or the N beams with the best L1-RSRP statistics), where, in some case, N may be less than 2 or 4 depending on UE 115-a capability. In some examples, base station 105-a may configure UE 115-a to only report the best beam (e.g., N=1). Based on the UE BM report, the base station 105-a may select the best control/data downlink transmit beam 230.

Additionally or alternatively, UEs (e.g., UE 115-a) may report UE feedback on beam R/D mode. For example, UE 115-a may store RSRP/SINR statistics of different downlink transmit beams 230 (e.g., determined from measured RSs, such as RS 205, received from base station 105-a via the different downlink transmit beams 230). The UE 115-a may use these RSRP/SINR statistics to make more accurate and timely decisions on beam R/D mode per reported beams (e.g., per beams reported in a BM report). For each reported beam in a BM report, the UE 115-a may indicate if beam repetition techniques and/or beam diversity techniques are desirable based on corresponding RSRP/SINR statistics in previous BM measurements. That is, UE 115-a may use information that may not be reported (e.g., information such as SINR statistics, more frequent and recent RSRP/SINR statistics associated with RSs received between BM reports, RSRP/SINR statistics corresponding to new beams or beams not included in a BM report, etc.) to determine more accurate and timely beam R/D modes.

For a new beam or a selected candidate beam (e.g., in a beam failure recovery (BFR) procedure), UE 115-a may indicate if beam repetition techniques and/or beam diversity techniques are desirable based on previously measured RSRP/SINR statistics on RSs for the selected candidate beam. For example, in a BFR procedure, UE 115-a may detect all downlink control beams have failed. The UE 115-a may initiate the BFR procedure and select a candidate beam (e.g., a new beam) from beams configured by the base station 105-a. Once the UE 115-a selects a candidate beam, the UE 115-a may send a RACH preamble to the candidate beam. In response, the base station 105-a may transmit a BFR message using the candidate beam. That is, UE 115-a may indicate a beam R/D mode when indicating a new candidate beam during a BFR procedure, as the base station 105-a may not have much information associated with RSRP/SINR statistics corresponding to the new candidate beam (e.g., if the candidate beam was not included in recent BM reports from the UE 115-a).

For a selected beam being used, UE 115-a may be capable of more frequent assessments on control beam quality by reusing existing RS for beam failure detection (BFD) or PDCCH DMRS (e.g., besides or in addition to RS for BM). UE 115-a may transmit a BFR request when BF is detected. However, UE 115-a may indicate if beam repetition techniques and/or beam diversity techniques are desirable before BF happens with RSRP/SINR statistics measured RS for BFD or PDCCH DMRS. For example, in some cases, RS for BFD or PDCCH DMRS sequence may be configured more frequently than RS for BM. As such, the UE 115-a may more timely detect on beam quality degradation. Further, in some examples, the UE 115-a may use acquired RSRP/SINR statistics to indicate a beam R/D mode prior to a BF.

In some cases, UE feedback on beam R/D modes (e.g., UE feedback 210) may include periodic or semi-persistent feedback. The feedback may be configured by RRC, and in some cases may be activated via media access control (MAC) control element (MAC-CE). Periodic or semi-persistent feedback may be used when the base station 105-a prefers continuous input from the UE 115-a on beam R/D mode of reported beam(s). In other cases, UE feedback 210 may include aperiodic feedback. The UE feedback 210 may be polled by base station 105-a (e.g., via DCI), and may be used when the base station 105-a currently needs more inputs on certain beams (e.g., on certain downlink transmit beams 230). UE feedback 210 may use a dedicated resource (e.g., configured by RRC) or may be piggybacked on periodic, semi-persistent, or aperiodic BM reports (e.g., UE feedback 210 may include feedback per beam in BM report).

In yet other cases, UE feedback 210 may include autonomous feedback. That is, UE feedback 210 may be autonomously sent by UE 115-a, and may be used when UE 115-a identifies certain beam R/D mode reporting criteria. For example, criteria for autonomous UE feedback 210 may include detecting a current beam R/D mode is not optimal for the beam being used, identifying that a duration of time since a previous BM report has been transmitted exceeds a threshold (e.g., determining base station 105-a may have insufficient data to make beam R/D mode decisions), identifying a second beam R/D mode for a beam associated with the beam RS (e.g., RS 205), identifying a new beam or a new candidate beam should be used, etc. Autonomous feedback (e.g., autonomous UE feedback 210) may be piggybacked on uplink data (e.g., in MAC-CE), or UE 115-a may send a scheduling request (SR) for base station 105-a to schedule UE feedback 210.

If the feedback is for a candidate beam selected by UE 115-a in a BFR procedure, UE 115-a may indicate the feedback in message 1, message 3, or any later uplink message in BFR. If the feedback is indicated in message 1 of BFR, different physical random access channel (PRACH) resources or preambles may be reserved for UE 115-a to signal the beam R/D mode of the selected candidate beam. For each type, feedback may be configured to be sent in physical uplink control channel (PUCCH) or PUSCH, and base station 105-a may configure detailed feedback contents as described in more detail below. To save overhead, base station 105-a may configure UE 115-a to report a simple indicator on the selected beam R/D mode, based on which the base station 105-a may further poll UE 115-a for detailed information (e.g., including operating parameters or channel quality statistics to derive operating parameters).

UE feedback 210 may include a beam R/D mode indicator (e.g., a 2-bit indicator, indicating one of the four beam R/D modes described herein for a beam corresponding to the UE feedback 210), channel quality statistics 220 (e.g., RSRP/reference signal received quality (RSRQ)/SINR statistics), operating parameters 225 (e.g., beam R/D mode operating parameters), etc.

The contents of the UE feedback 210 may depend on whether the UE feedback 210 is associated with downlink transmission beams 230 or uplink transmission beams 245. For example, UE feedback 210 may include channel quality statistics 220 per downlink transmit beam 230, identified by the downlink transmit beam 230 QCL information (e.g., QCLed with SSB/CSI-RS resource ID). Channel quality statistics 220 may include mean, variance, and percentages of RSRP/RSRQ/SINR of reported downlink transmission beams 230 for the base station 105-a to determined detailed operating parameters. Related operating parameters 225 may include a repetition number associated with the reported downlink transmit beam 230 (e.g., in cases where a beam R/D mode that includes beam repetition techniques is indicated, UE 115-a may determine a beam repetition number based on mean RSRP/SINR statistics), other beam indices to be used with the reported downlink transmit beam 230 as well as their transmission order (e.g., in cases where a beam R/D mode that includes beam diversity techniques is indicated, the UE 115-a may pick beams in descending order of mean RSRP/SINR for early decoding), other beam indices to be used with the reported beam as well as a mixed diversity and repetition transmission pattern (e.g., in cases where a beam R/D mode that includes both beam repetition techniques and beam diversity techniques is indicated), etc.

However, in cases where UE feedback 210 is associated with uplink transmission beams 245, the UE feedback 210 may not necessarily include channel quality statistics 220. For example, UE feedback 210 (e.g., when indicating uplink transmit beams 245, identified by spatial relation information such as uplink sounding reference signal (SRS) ID or downlink SSB/CSI-RS resource ID) may include a 2-bit beam R/D mode indicator on corresponding beam R/D mode for the uplink direction. Further, the related operating parameters 225 may include a repetition number of the indicated uplink transmit beam 245 (e.g., for reported beam R/D modes that include beam repetition techniques), other uplink transmit beam indices to be used with the indicated uplink transmit beam 245 as well as their transmission order (e.g., for reported beam R/D modes that include beam diversity techniques), other uplink transmit beam indices to be used with the indicated uplink transmit beam 245 as well as their mixed diversity and repetition pattern (for reported beam R/D modes that include both beam repetition techniques and beam diversity techniques), etc. UE 115-a may determine uplink beam R/D mode and related operating parameters 225 based on estimated uplink channel quality statistics 220 of the beam indicated in the UE feedback 210. For example, the UE 115-a may determine uplink beam R/D mode based on mean and variance of RSRP/SINR, which may be estimated from downlink channel quality and downlink/uplink transmit power difference, and potentially with statistics on maximum uplink transmit power limit imposed by maximum permissible exposure (MPE) requirement.

Figure 3:
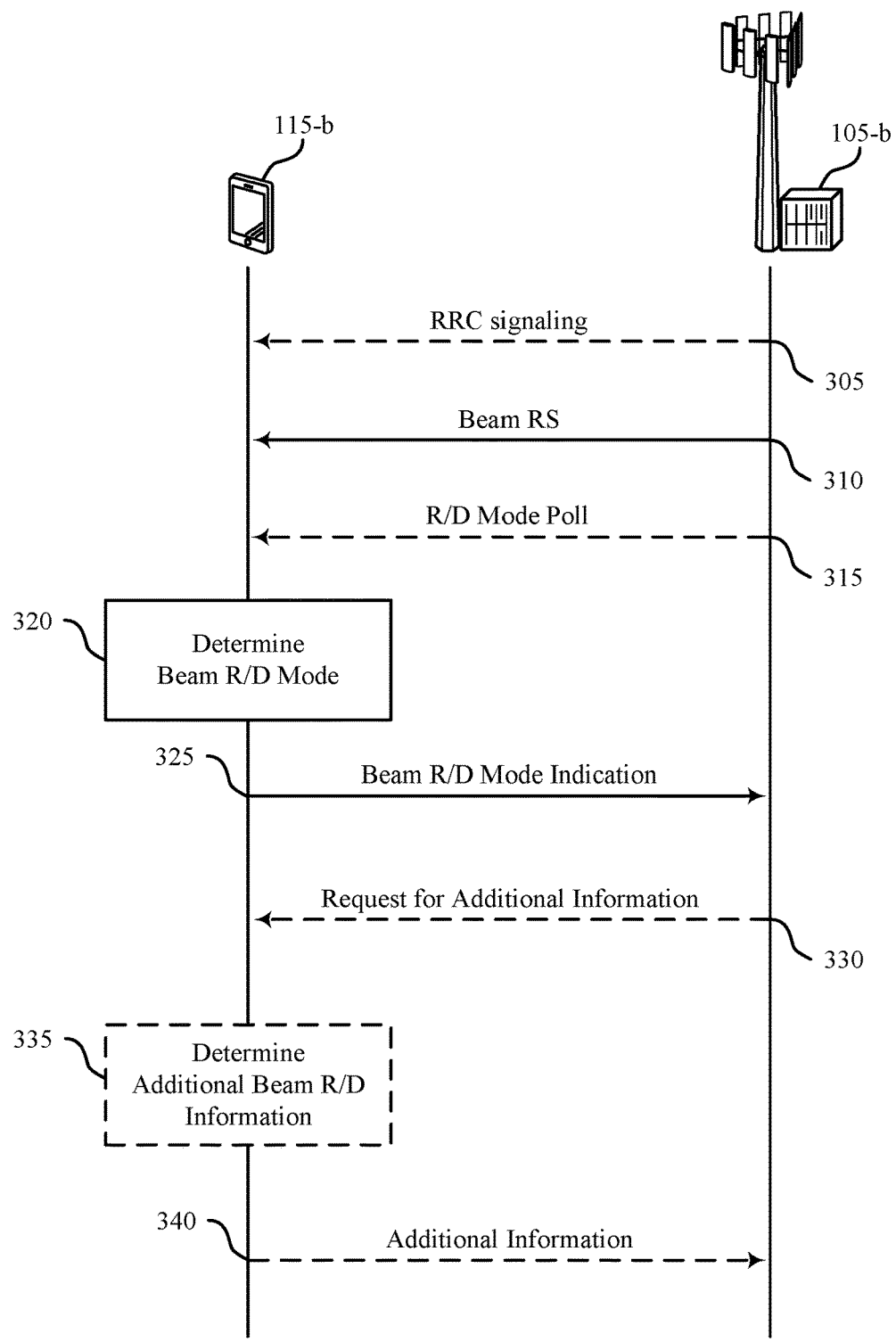
FIG. 3 illustrates an example of a process flow that supports feedback of a beam R/D mode in accordance with aspects of the present disclosure.

FIG. 3 illustrates an example of a process flow 300 that supports feedback of a beam R/D mode in accordance with aspects of the present disclosure. In some examples, process flow 300 may implement aspects of wireless communications system 100 and wireless communications system 200. Process flow 300 includes base station 105-b and UE 115-b, which may be examples of base stations 105 and UEs 115 as described with reference to FIGS. 1 and 2. Process flow 300 may illustrate UE 115-b providing UE feedback of beam R/D mode to base station 105-b according to techniques described herein. In the following description of the process flow 300, the operations between the UE 115-b and the base station 105-b may be transmitted in a different order than the exemplary order shown, or the operations performed by UE 115-b may be performed in different orders or at different times. In some cases, certain operations may also be left out of the process flow 300, or other operations may be added to the process flow 300.

At 305, base station 105-b may transmit RRC signaling to UE 115-b. In some cases, the RRC message may allocate resources for periodic or semi-persistent reporting of an indication of a beam R/D mode reporting (e.g., the RRC message may allocate resources for the indication of the beam R/D mode transmitted at 320). In some examples, a MAC-CE may be transmitted by base station 105-b such that, when received by UE 115-b, the UE 115-b may activate the periodic of semi-persistent reporting of the indication of the beam R/D mode.

At 310, base station 105-b may transmit a beam RS to UE 115-b. UE 115-b may measure one or more characteristics (e.g., RSRP, RSRQ, SINR, etc.) of the beam RS.

At 315, base station 105-b may poll UE 115-b to report a beam R/D mode.

At 320, UE 115-b may determine (e.g., at the UE 115-b) a beam R/D mode to be used in communications between the UE 115-b and the base station 105-b based on the one or more signal characteristics measured at 310. In some examples, determining the beam R/D mode may include selecting from a beam repetition mode, a beam diversity mode, a mixed beam R/D mode, or a no beam R/D mode (e.g., and a 2-bit indicator may be used in the indication to indicate the selected beam R/D mode).

At 325, UE 115-b may transmit an indication of the determined beam R/D mode to base station 105-b. In some cases, the UE 115-b may transmit, with the indication of the determined beam R/D mode, an identification of one or more beams (e.g., one or more downlink transmit beams, one or more uplink transmit beams, etc.) to which the determined beam R/D mode is to be applied. In some cases, the indication of the determined beam R/D mode may be included in a BM report (e.g., a BM report including an indication of the determined beam R/D mode may be transmitted at 325). In some examples, channel quality information associated with each of one or more beams to which the determined beam R/D mode is to be applied and/or operating parameters associated with the beam R/D mode may be transmitted at 325 (e.g., along with the indication of the determined beam R/D mode). Operating parameters may include a number of beam repetitions for each of the one or more beams, beam indices associated with the one or more beams, a transmissions order associated with the one or more beams, a mixed beam repetition and diversity pattern, etc. The operating parameters associated with the beam R/D mode determined at 320 may be determined based on the one or more signal characteristics of the beam RS measured at 310. For example, the number of beam repetitions for each of the one or more beams may depend on RSRP/SINR of the beam RS measured at 310, etc.

In some cases, the indication of the determined beam R/D mode may be transmitted based on an explicit request received from base station 105-b (e.g., which may be received via DCI) (at 315). In some examples, UE 115-b may transmit the indication of the determined beam R/D mode based on identifying that certain beam R/D mode reporting criteria has been satisfied. Identifying that certain beam R/D mode reporting criteria has been satisfied may include identifying that a duration of time since a previous BM report has been transmitted exceeds a threshold, identifying a second beam R/D mode for a beam associated with the beam RS measured at 310, etc. In cases where RRC signaling is received (e.g., at 305) that indicates periodic, semi-persistent, or aperiodic BM reporting, the indication of the determined beam R/D mode may be piggybacked with uplink data or may be included with a SR. In some examples, transmitting the indication of the determined beam R/D mode may include selecting RACH resources or a RACH preamble based on the determined beam R/D mode, and transmitting an uplink message to the base station 105-b that includes at least one of the selected RACH resources or RACH preamble as the indication.

In some cases, the beam R/D mode indication transmitted at 325 may include a BFR request. For example, UE 115-b may include the indication of the determined beam R/D mode in a BFR request, wherein the determined beam R/D mode is associated with a candidate beam in a BFR procedure.

In some cases, base station 105-*b* may transmit a request for additional information at 330. The request for additional information may include a request for additional information relating to the determined beam R/D mode. For example, if UE 115-*b* only reports the beam R/D mode indicator at 325 (without additional accompanying information), base station 105-*b* may request the additional information (such as channel quality information associated with each of one or more beams to which the determined beam R/D mode is to be applied and/or operating parameters associated with the beam R/D mode.

At 335, UE 115-*b* may, in some cases, determine additional information relating to the determined beam R/D mode (e.g., operating parameters, channel quality statistics, etc.).

At 340, UE 115-*b* may, in some cases, transmit the additional information relating to the determined beam R/D mode. That is, UE 115-*b* may transmit, in response to the request, channel quality information associated with each of one or more beams to which the determined beam R/D mode is to be applied, operating parameters associated with the beam R/D mode, etc.

Figure 4:
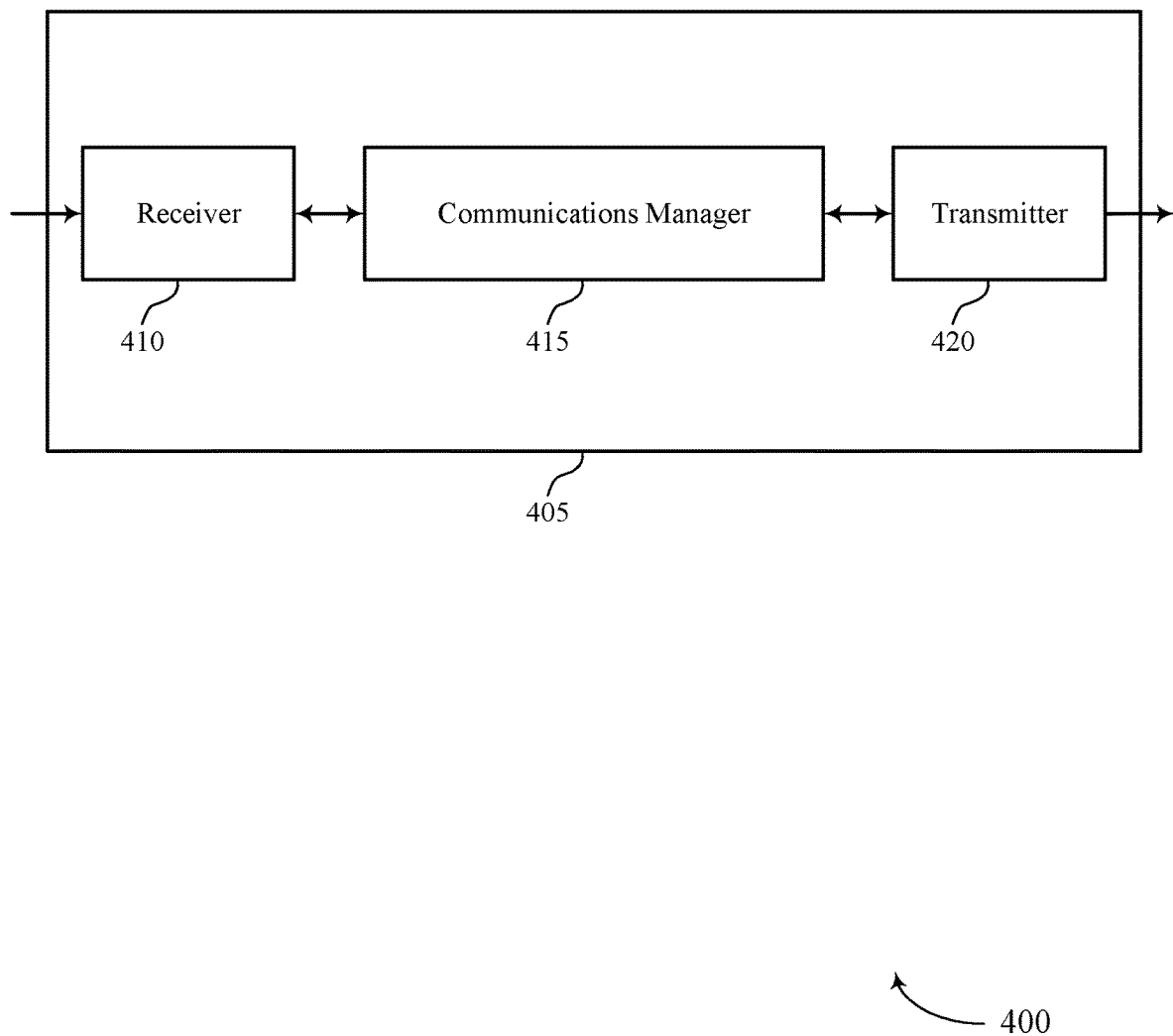
FIGS. 4 and 5 show block diagrams of devices that support feedback of a beam R/D mode in accordance with aspects of the present disclosure.

FIG. 4 shows a block diagram 400 of a device 405 that supports feedback of a beam R/D mode in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to feedback of beam R/D mode, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may measure one or more signal characteristics of a beam reference signal and determine, at the device 405, a beam R/D mode to be used in communications between the device 405 and a base station based on the one or more measured signal characteristics. The communications manager 415 may transmit an indication of the determined beam R/D mode to the base station. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
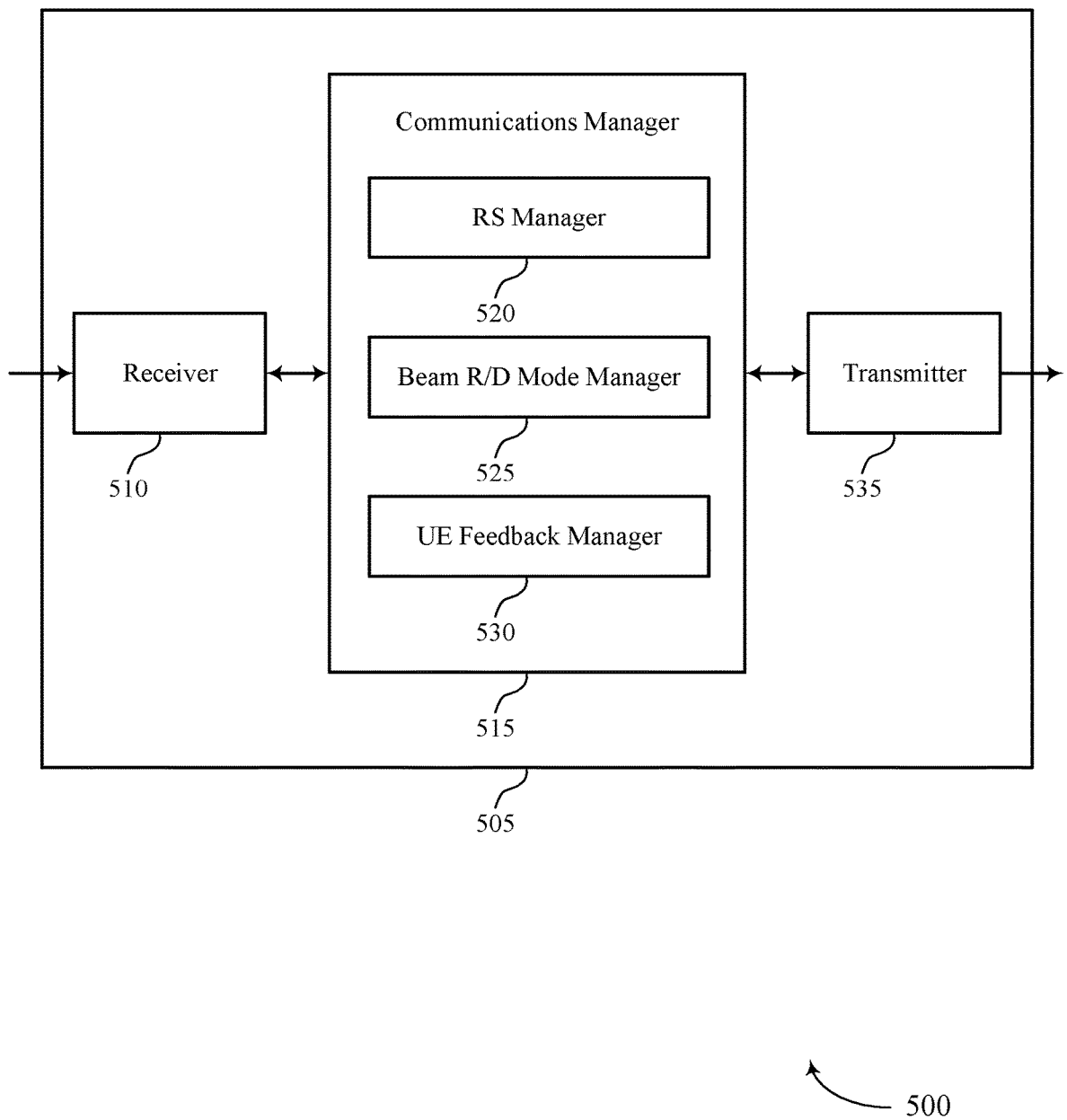

FIG. 5 shows a block diagram 500 of a device 505 that supports feedback of a beam R/D mode in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to feedback of beam R/D mode, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a RS manager 520, a beam R/D mode manager 525, and a UE feedback manager 530. The communications manager 515 may be an example of aspects of the communications manager 710 described herein.

The RS manager 520 may measure one or more signal characteristics of a beam reference signal. The beam R/D mode manager 525 may determine, at the device 505, a beam R/D mode to be used in communications between the device 505 and a base station based on the one or more measured signal characteristics. The UE feedback manager 530 may transmit an indication of the determined beam R/D mode to the base station.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
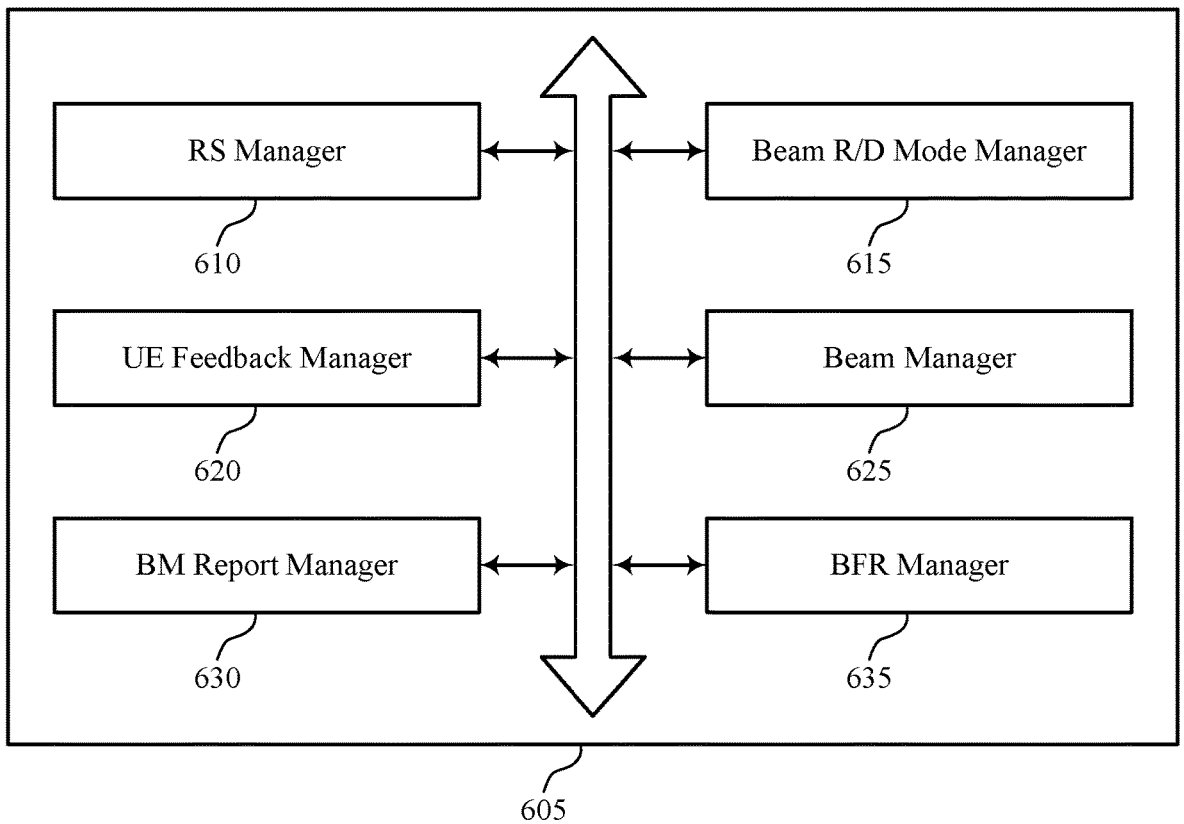
FIG. 6 shows a block diagram of a device that supports feedback of a beam R/D mode in accordance with aspects of the present disclosure.

FIG. 6 shows a block diagram 600 of a communications manager 605 that supports feedback of a beam R/D mode in accordance with aspects of the present disclosure. The communications manager 605 may be an example of aspects of a communications manager 415, a communications manager 515, or a communications manager 710 described herein. The communications manager 605 may include a RS manager 610, a beam R/D mode manager 615, a UE feedback manager 620, a beam manager 625, a BM report manager 630, and a BFR manager 635. Each of these modules may communicate, directly or indirectly, with one another (e.g., via one or more buses).

The RS manager 610 may measure (e.g., at a UE) one or more signal characteristics of a beam reference signal. The beam R/D mode manager 615 may determine (e.g., at a UE) a beam R/D mode to be used in communications between the UE and a base station based on the one or more measured signal characteristics. In some examples, the beam R/D mode manager 615 may transmit, with the indication of the determined beam R/D mode, channel quality information associated with each of one or more beams to which the determined beam R/D mode is to be applied, operating parameters associated with the beam R/D mode, or some combination thereof. In some examples, the beam R/D mode manager 615 may determine the operating parameters associated with the beam R/D mode based on the measured one or more signal characteristics of the beam reference signal.

In some examples, the beam R/D mode manager 615 may identify, at the UE, that a beam R/D mode reporting criteria is satisfied. In some examples, the beam R/D mode manager 615 may transmit the indication of the determined beam R/D mode based on the beam R/D mode reporting criteria being satisfied. In some examples, the beam R/D mode manager 615 may identify the beam R/D mode reporting criteria is satisfied includes identifying that a duration of time since a previous beam management report has been transmitted exceeds a threshold, identifying a second beam R/D mode for a beam associated with the beam reference signal, or some combination thereof. In some examples, the beam R/D mode manager 615 may transmit, in response to the request, channel quality information associated with each of one or more beams to which the determined beam R/D mode is to be applied, operating parameters associated with the beam R/D mode, or some combination thereof. In some cases, the operating parameters include a number of beam repetitions for each of the one or more beams, beam indices associated with the one or more beams, a transmissions order associated with the one or more beams, a mixed beam R/D pattern, or some combination thereof.

In some examples, the beam R/D mode manager 615 may select from a beam repetition mode, a beam diversity mode, a mixed beam R/D mode, or a no beam R/D mode, and where the indication of the determined beam R/D mode includes a 2-bit indicator that indicates the selected beam R/D mode.

The UE feedback manager 620 may transmit an indication of the determined beam R/D mode to the base station. In some examples, the UE feedback manager 620 may transmit the beam management report to the base station. In some examples, the UE feedback manager 620 may receive a RRC message allocating resources for periodic or semi-persistent reporting of the indication of the beam R/D mode reporting. In some examples, the UE feedback manager 620 may receive a MAC-CE, activating the periodic or semi-persistent reporting of the indication of the beam R/D mode. In some examples, the UE feedback manager 620 may receive, from the base station, a request that the indication of the determined beam R/D mode be transmitted to the base station. In some examples, the UE feedback manager 620 may transmit the indication on a dedicated resource or piggybacked with a periodic, semi-persistent, or aperiodic beam management report.

In some examples, the UE feedback manager 620 may transmit the indication piggybacked with uplink data or included in a dedicated uplink frame scheduled by an uplink grant triggered by a scheduling request. In some examples, the UE feedback manager 620 may select RACH resources or a RACH preamble based on the determined beam R/D mode. In some examples, the UE feedback manager 620 may transmit an uplink message to the base station that includes at least one of the selected RACH resources or RACH preamble as the indication. In some examples, the UE feedback manager 620 may receive, from the base station, a request for additional information relating to the determined beam R/D mode. In some cases, the request is received in DCI.

The beam manager 625 may transmit, with the indication of the determined beam R/D mode, an identification of one or more beams to which the determined beam R/D mode is to be applied. The BM report manager 630 may include the indication of the determined beam R/D mode in a beam management report. The BFR manager 635 may include the indication of the determined beam R/D mode in a BFR request, where the determined beam R/D mode is associated with a candidate beam in a BFR procedure. In some examples, the BFR manager 635 may transmit the BFR request to the base station.

Figure 7:
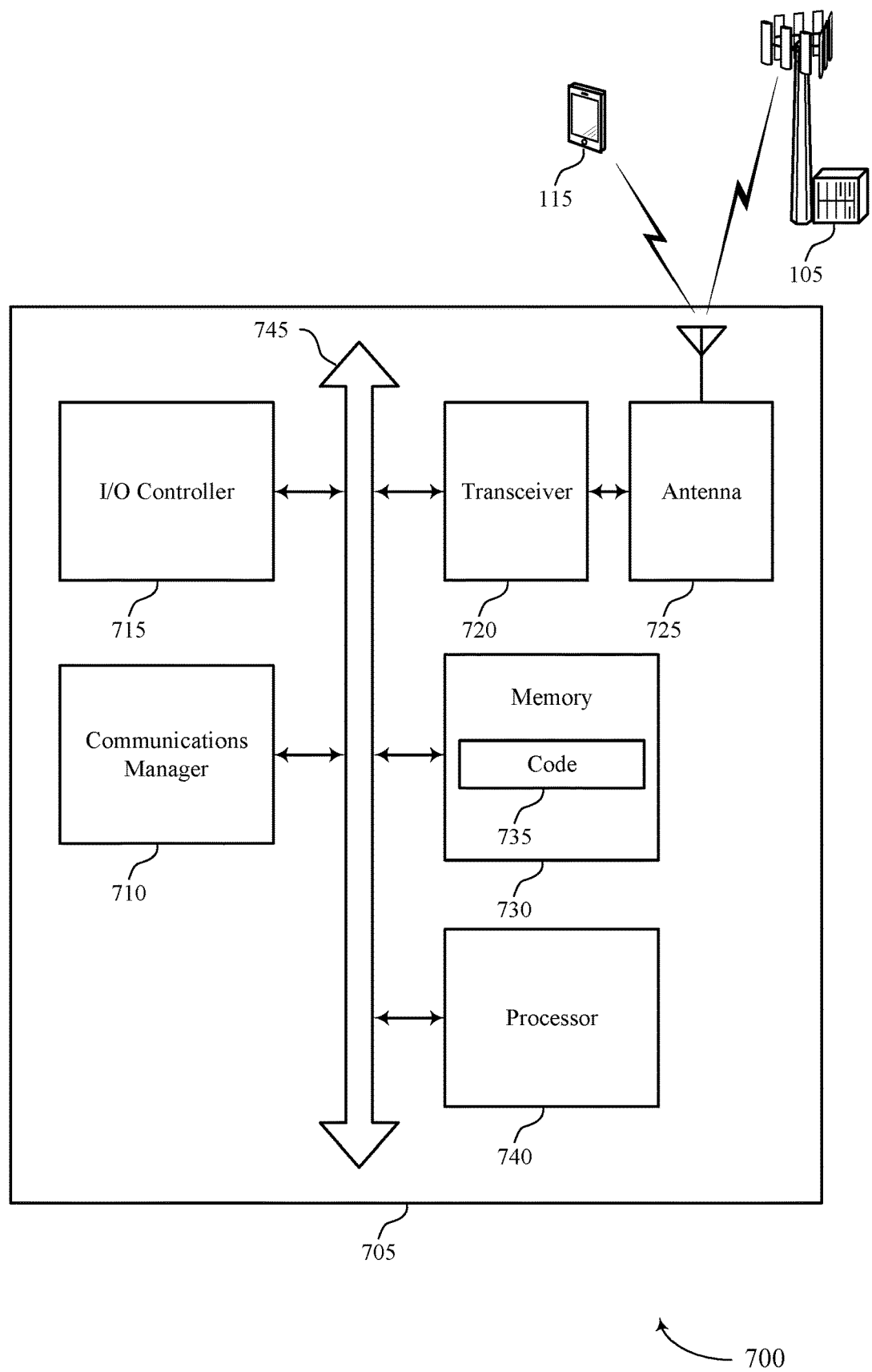
FIG. 7 shows a diagram of a system including a device that supports feedback of a beam R/D mode in accordance with aspects of the present disclosure.

FIG. 7 shows a diagram of a system 700 including a device 705 that supports feedback of a beam R/D mode in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may measure, at the device 705, one or more signal characteristics of a beam reference signal and determine, at the device 705, a beam R/D mode to be used in communications between the UE and a base station based on the one or more measured signal characteristics. The communications manager 710 may transmit an indication of the determined beam R/D mode to the base station.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback of beam R/D mode).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
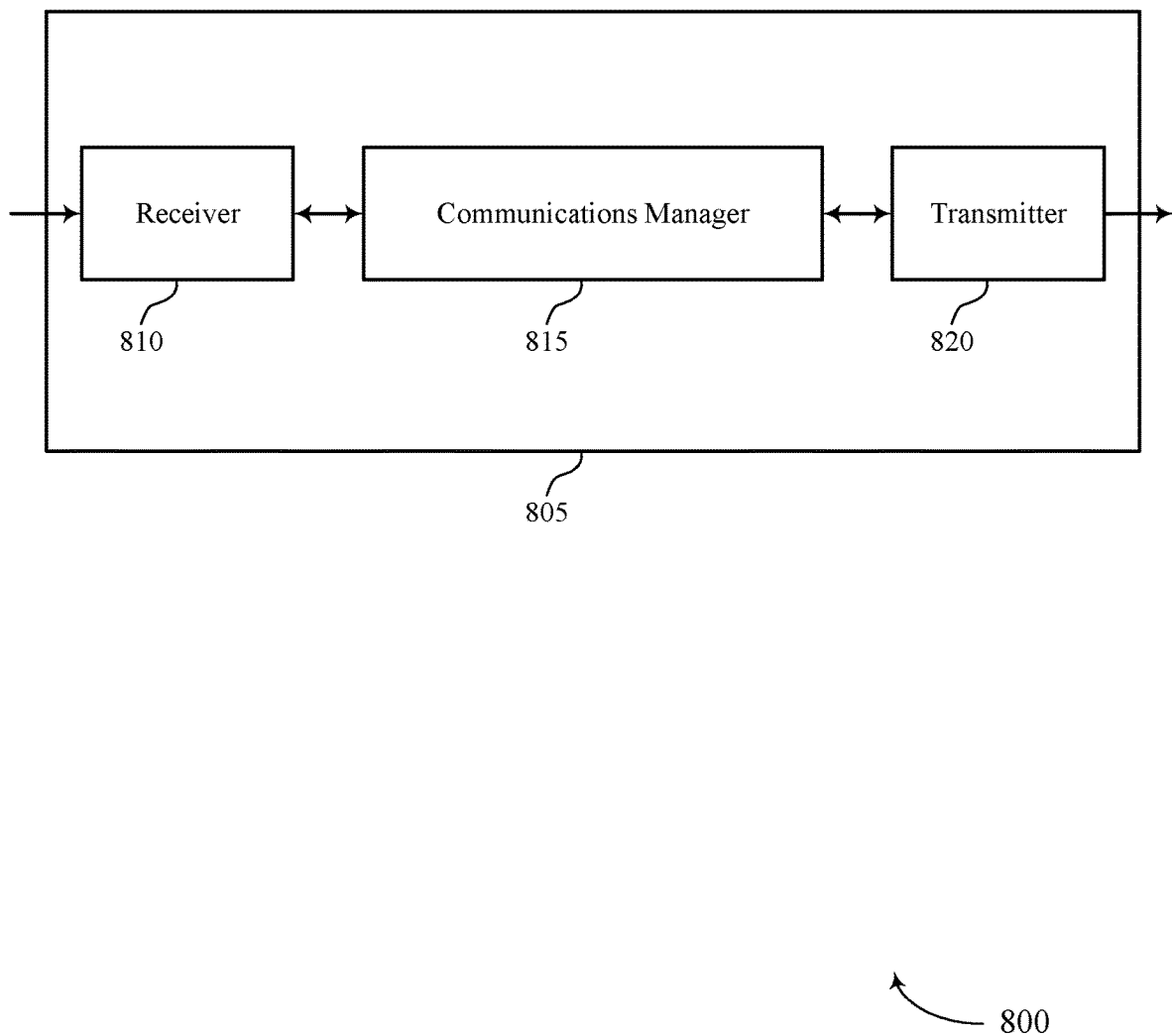
FIGS. 8 and 9 show block diagrams of devices that support feedback of a beam R/D mode in accordance with aspects of the present disclosure.

FIG. 8 shows a block diagram 800 of a device 805 that supports feedback of a beam R/D mode in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to feedback of beam R/D mode, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive (e.g., from a UE) an indication of a beam R/D mode to be used in communications between the UE and device 805 and communicate with the UE based on the received indication. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
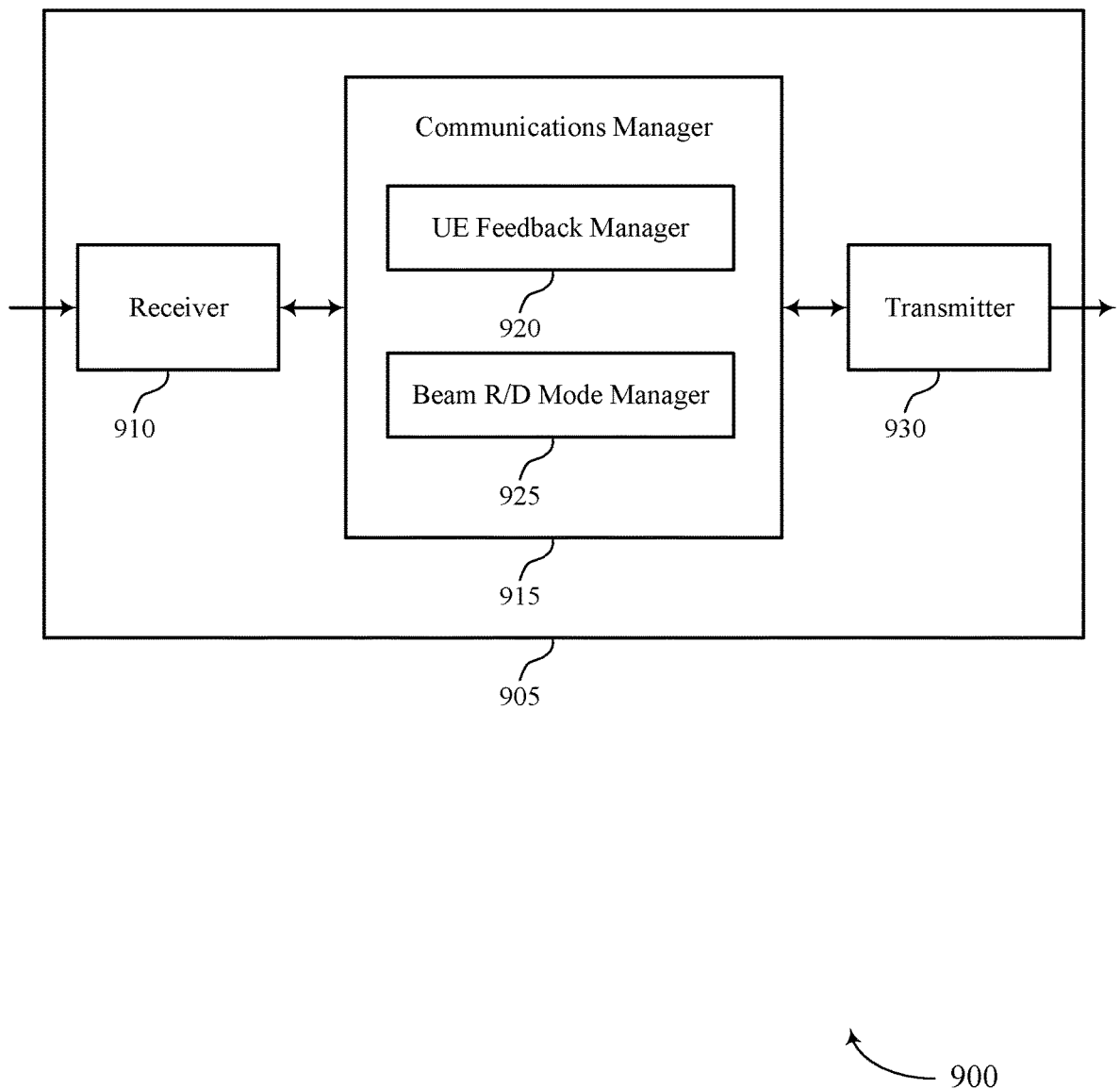

FIG. 9 shows a block diagram 900 of a device 905 that supports feedback of a beam R/D mode in accordance with aspects of the present disclosure. The device 905 may be an example of aspects of a device 805 or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to feedback of beam R/D mode, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE feedback manager 920 and a beam R/D mode manager 925. The communications manager 915 may be an example of aspects of the communications manager 1110 described herein.

The UE feedback manager 920 may receive (e.g., from a UE) an indication of a beam R/D mode to be used in communications between the UE and the device 905. The beam R/D mode manager 925 may communicate with the UE based on the received indication. The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
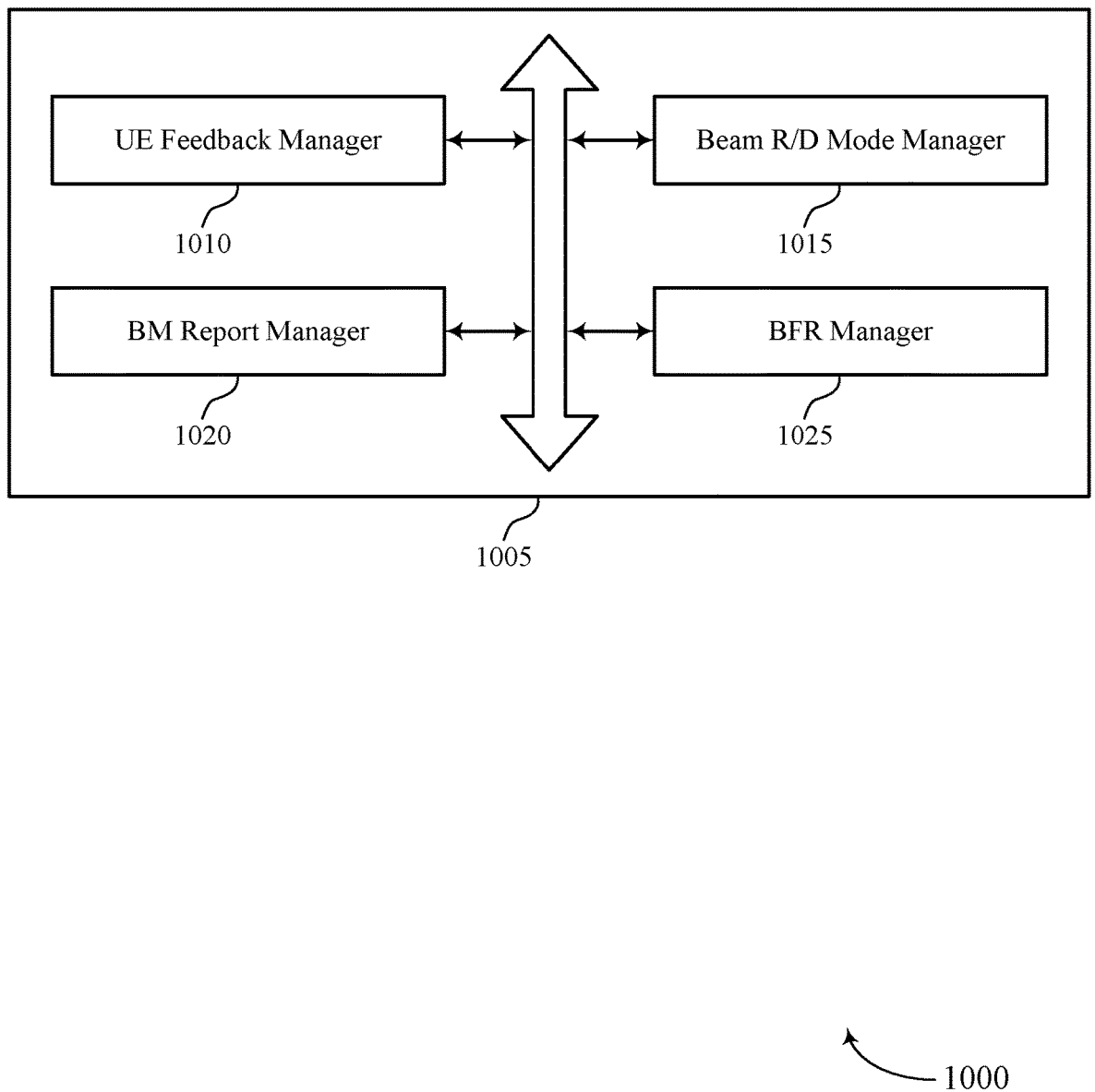
FIG. 10 shows a block diagram of a device that supports feedback of a beam R/D mode in accordance with aspects of the present disclosure.

FIG. 10 shows a block diagram 1000 of a communications manager 1005 that supports feedback of a beam R/D mode in accordance with aspects of the present disclosure. The communications manager 1005 may be an example of aspects of a communications manager 815, a communications manager 915, or a communications manager 1110 described herein. The communications manager 1005 may include a UE feedback manager 1010, a beam R/D mode manager 1015, a BM report manager 1020, and a BFR manager 1025. Each of these modules may communicate, directly or indirectly, with one another (e.g., via one or more buses).

The UE feedback manager 1010 may receive (e.g., from a UE) an indication of a beam R/D mode to be used in communications between the UE and the base station. In some examples, the UE feedback manager 1010 may receive the indication on a dedicated resource or piggybacked with a periodic, semi-persistent, or aperiodic beam management report from the UE. In some examples, the UE feedback manager 1010 may receive, from the UE, the indication piggybacked with uplink data or included in a dedicated uplink frame scheduled by an uplink grant triggered by a scheduling request. In some examples, the UE feedback manager 1010 may receive an uplink message from the UE that includes at least one of a RACH resource or a RACH preamble as the indication.

In some examples, the UE feedback manager 1010 may receive, in response to the request, channel quality information associated with each of one or more beams to which the beam R/D mode is to be applied, operating parameters associated with the beam R/D mode, or some combination thereof. The beam R/D mode manager 1015 may communicate with the UE based on the received indication. In some examples, the beam R/D mode manager 1015 may receive, with the indication of the beam R/D mode, an identification of one or more beams to which the beam R/D mode is to be applied. In some examples, the beam R/D mode manager 1015 may receive, with the indication of the beam R/D mode, channel quality information associated with each of one or more beams to which the beam R/D mode is to be applied, operating parameters associated with the beam R/D mode, or some combination thereof. In some cases, the operating parameters include a number of beam repetitions for each of the one or more beams, beam indices associated with the one or more beams, a transmissions order associated with the one or more beams, a mixed beam R/D pattern, or some combination thereof.

In some examples, the beam R/D mode manager 1015 may transmit a RRC message allocating resources for periodic or semi-persistent reporting of the indication of the beam R/D mode reporting. In some examples, the beam R/D mode manager 1015 may transmit a MAC-CE, activating the periodic or semi-persistent reporting of the indication of the beam R/D mode. In some examples, the beam R/D mode manager 1015 may transmit a request that the indication of the beam R/D mode be transmitted from the UE. In some examples, the beam R/D mode manager 1015 may transmit, to the UE, a request for additional information relating to the beam R/D mode. In some cases, the request is transmitted in DCI. The BM report manager 1020 may receive the indication of the beam R/D mode in a beam management report. The BFR manager 1025 may receive the indication of the beam R/D mode in a BFR request, where the beam R/D mode is associated with a candidate beam in a BFR procedure.

Figure 11:
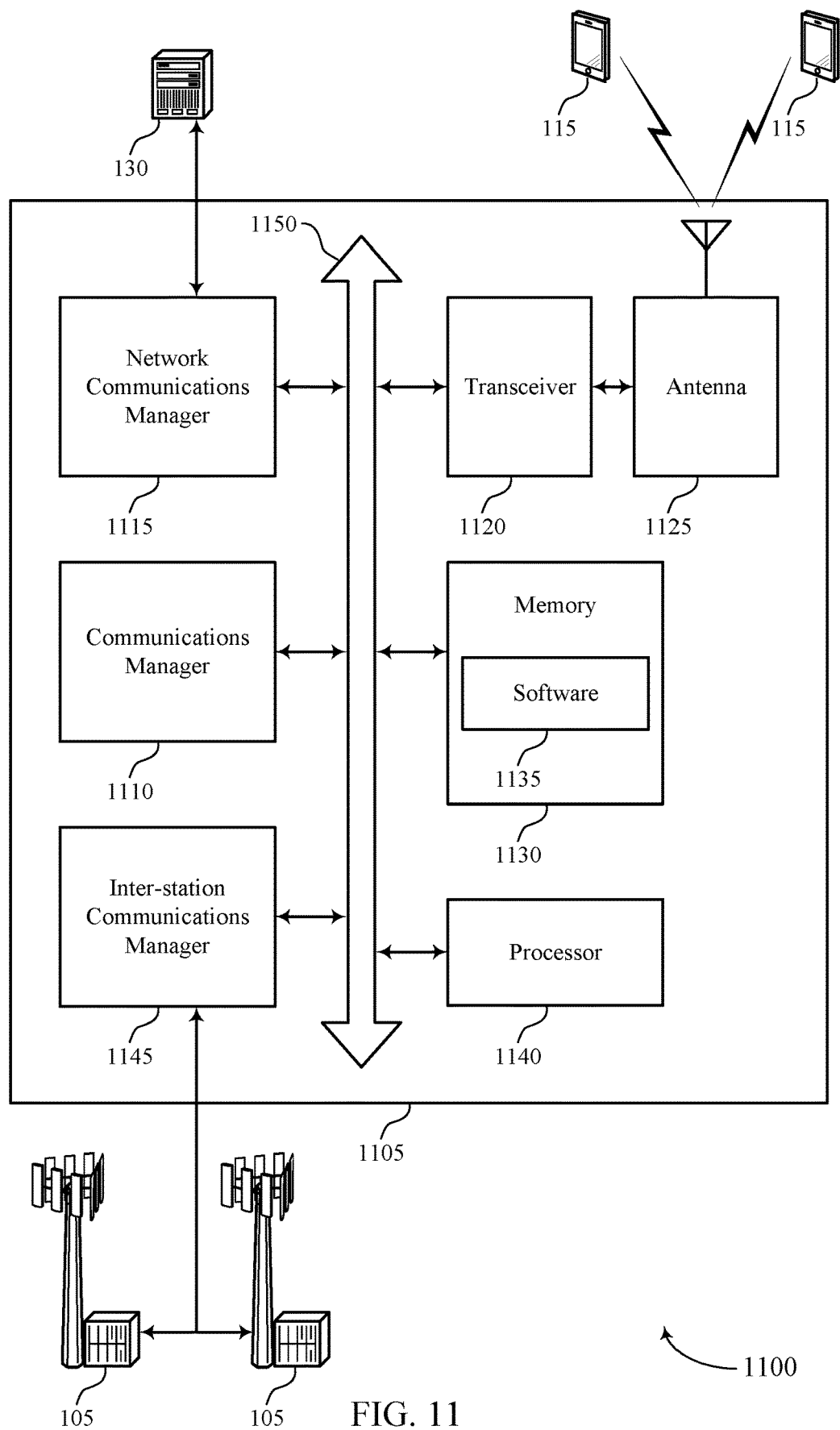
FIG. 11 shows a diagram of a system including a device that supports feedback of a beam R/D mode in accordance with aspects of the present disclosure.

FIG. 11 shows a diagram of a system 1100 including a device 1105 that supports feedback of a beam R/D mode in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive (e.g., from a UE) an indication of a beam R/D mode to be used in communications between the UE and the device 1105 and communicate with the UE based on the received indication. The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable, computer-executable software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device #{device} to perform various functions (e.g., functions or tasks supporting feedback of beam R/D mode).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Software 1135 may include code to implement aspects of the present disclosure, including code to support resynchronization signal transmission in wireless communications. Software 1135 may be stored in a non-transitory computer-readable medium such as system memory or other memory. In some cases, the software 1135 may not be directly executable by the processor but may cause a computer (e.g., when compiled and executed) to perform functions described herein.

Figure 12:
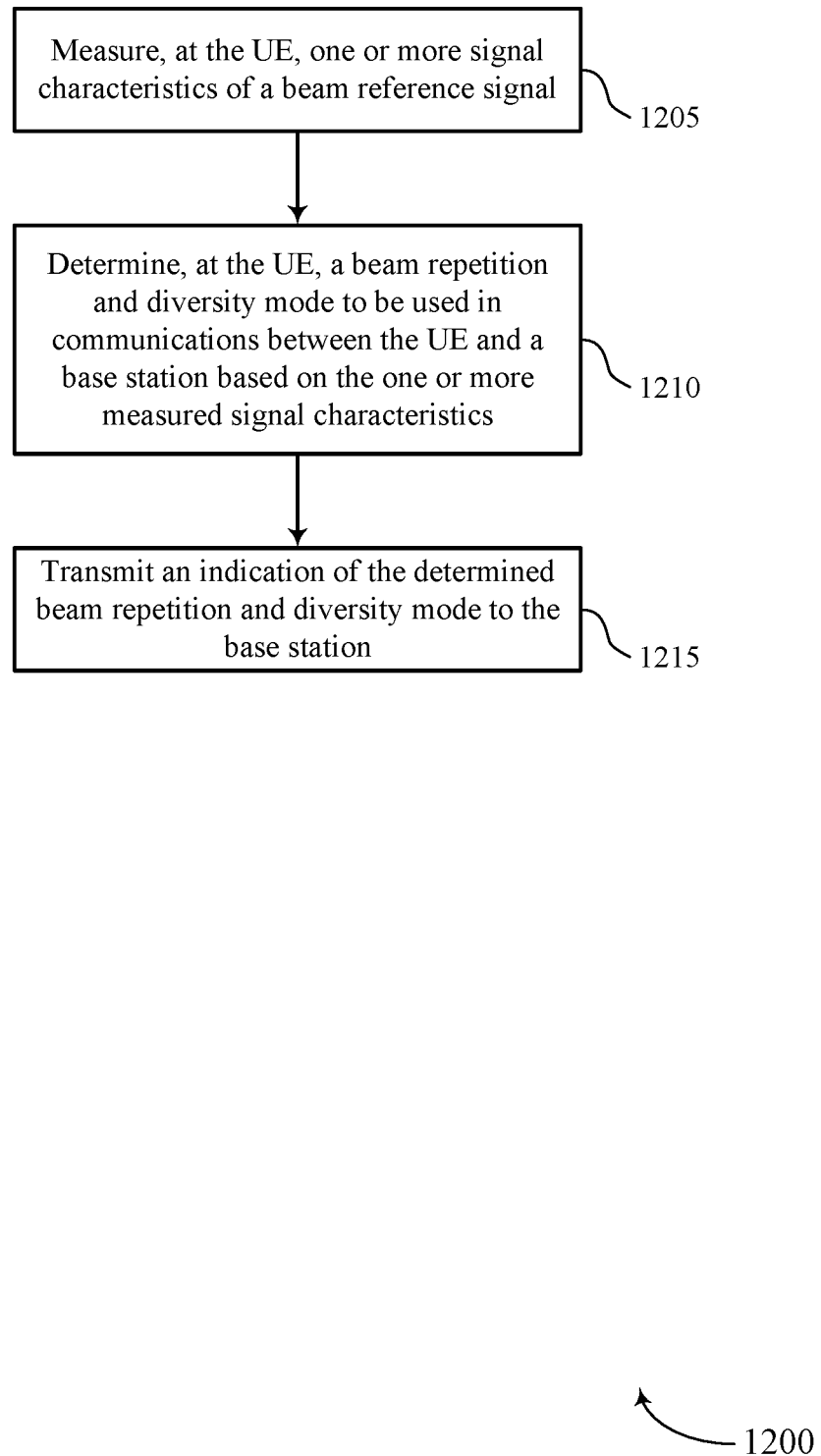
FIGS. 12 through 18 show flowcharts illustrating methods that support feedback of a beam R/D mode in accordance with aspects of the present disclosure.

FIG. 12 shows a flowchart illustrating a method 1200 that supports feedback of a beam R/D mode in accordance with aspects of the present disclosure. The operations of method 1200 may be implemented by a UE 115 or its components as described herein. For example, the operations of method 1200 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1205, the UE may measure, at the UE, one or more signal characteristics of a beam reference signal. The operations of 1205 may be performed according to the methods described herein. In some examples, aspects of the operations of 1205 may be performed by a RS manager as described with reference to FIGS. 4 to 7.

At 1210, the UE may determine, at the UE, a beam R/D mode to be used in communications between the UE and a base station based on the one or more measured signal characteristics. The operations of 1210 may be performed according to the methods described herein. In some examples, aspects of the operations of 1210 may be performed by a beam R/D mode manager as described with reference to FIGS. 4 to 7.

At 1215, the UE may transmit an indication of the determined beam R/D mode to the base station. The operations of 1215 may be performed according to the methods described herein. In some examples, aspects of the operations of 1215 may be performed by a UE feedback manager as described with reference to FIGS. 4 to 7.

Figure 13:
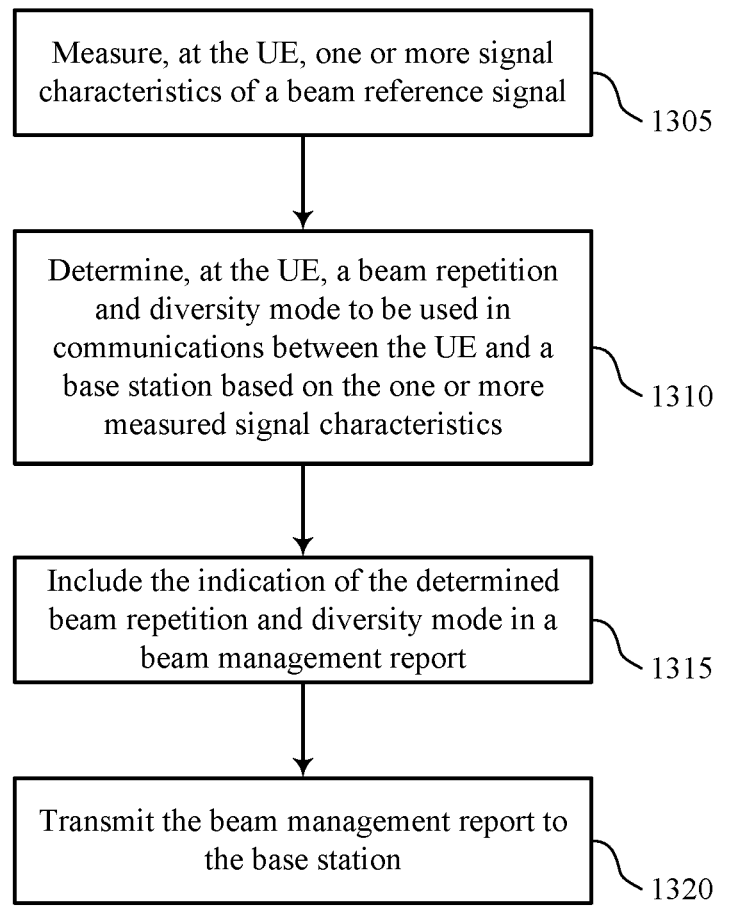

FIG. 13 shows a flowchart illustrating a method 1300 that supports feedback of a beam R/D mode in accordance with aspects of the present disclosure. The operations of method 1300 may be implemented by a UE 115 or its components as described herein. For example, the operations of method 1300 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1305, the UE may measure, at the UE, one or more signal characteristics of a beam reference signal. The operations of 1305 may be performed according to the methods described herein. In some examples, aspects of the operations of 1305 may be performed by a RS manager as described with reference to FIGS. 4 to 7.

At 1310, the UE may determine, at the UE, a beam R/D mode to be used in communications between the UE and a base station based on the one or more measured signal characteristics. The operations of 1310 may be performed according to the methods described herein. In some examples, aspects of the operations of 1310 may be performed by a beam R/D mode manager as described with reference to FIGS. 4 to 7.

At 1315, the UE may include the indication of the determined beam R/D mode in a beam management report. The operations of 1315 may be performed according to the methods described herein. In some examples, aspects of the operations of 1315 may be performed by a BM report manager as described with reference to FIGS. 4 to 7.

At 1320, the UE may transmit the beam management report to the base station. The operations of 1320 may be performed according to the methods described herein. In some examples, aspects of the operations of 1320 may be performed by a UE feedback manager as described with reference to FIGS. 4 to 7.

Figure 14:
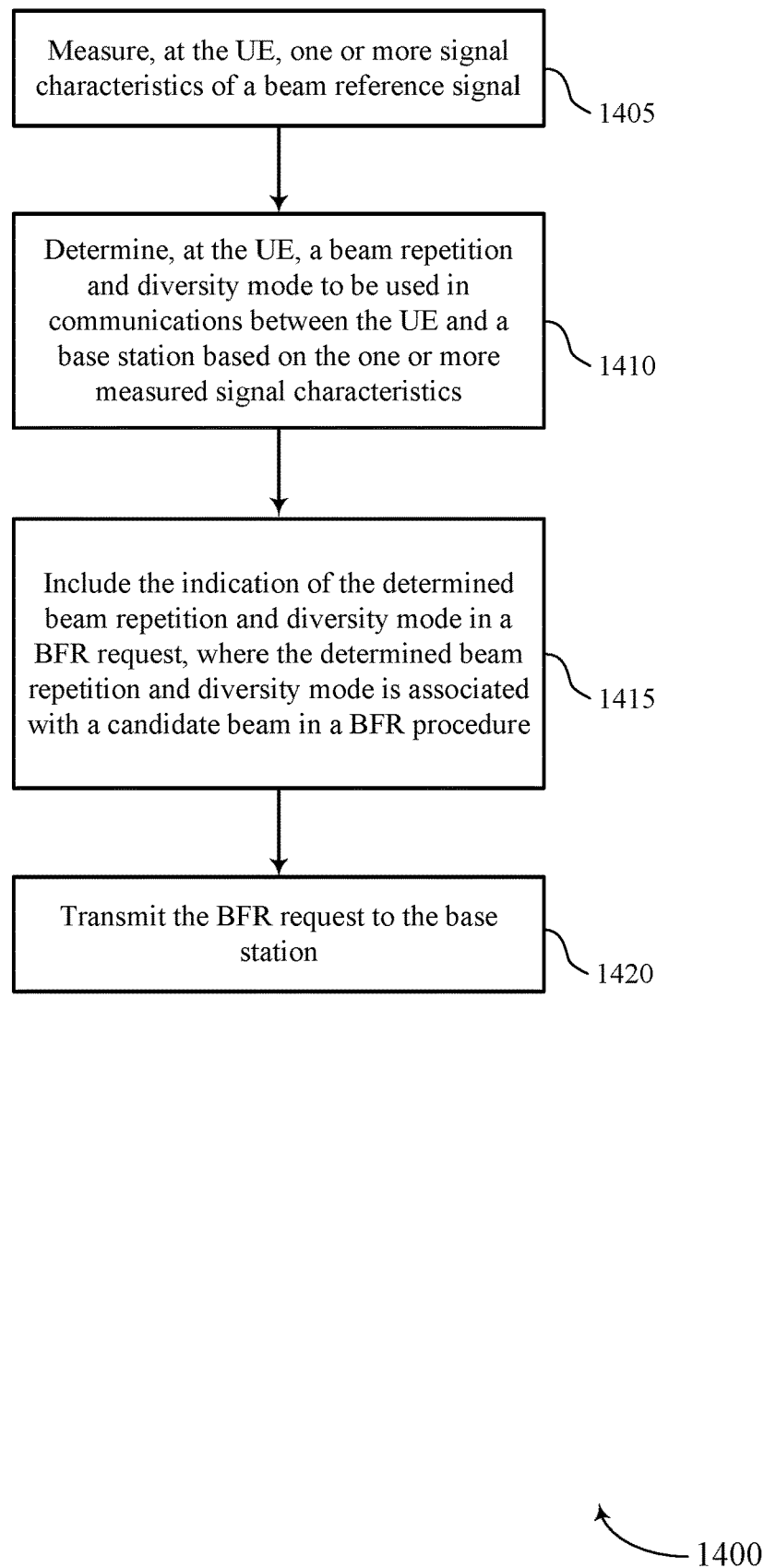

FIG. 14 shows a flowchart illustrating a method 1400 that supports feedback of a beam R/D mode in accordance with aspects of the present disclosure. The operations of method 1400 may be implemented by a UE 115 or its components as described herein. For example, the operations of method 1400 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1405, the UE may measure, at the UE, one or more signal characteristics of a beam reference signal. The operations of 1405 may be performed according to the methods described herein. In some examples, aspects of the operations of 1405 may be performed by a RS manager as described with reference to FIGS. 4 to 7.

At 1410, the UE may determine, at the UE, a beam R/D mode to be used in communications between the UE and a base station based on the one or more measured signal characteristics. The operations of 1410 may be performed according to the methods described herein. In some examples, aspects of the operations of 1410 may be performed by a beam R/D mode manager as described with reference to FIGS. 4 to 7.

At 1415, the UE may include the indication of the determined beam R/D mode in a BFR request, where the determined beam R/D mode is associated with a candidate beam in a BFR procedure. The operations of 1415 may be performed according to the methods described herein. In some examples, aspects of the operations of 1415 may be performed by a BFR manager as described with reference to FIGS. 4 to 7.

At 1420, the UE may transmit the BFR request to the base station. The operations of 1420 may be performed according to the methods described herein. In some examples, aspects of the operations of 1420 may be performed by a BFR manager as described with reference to FIGS. 4 to 7.

Figure 15:
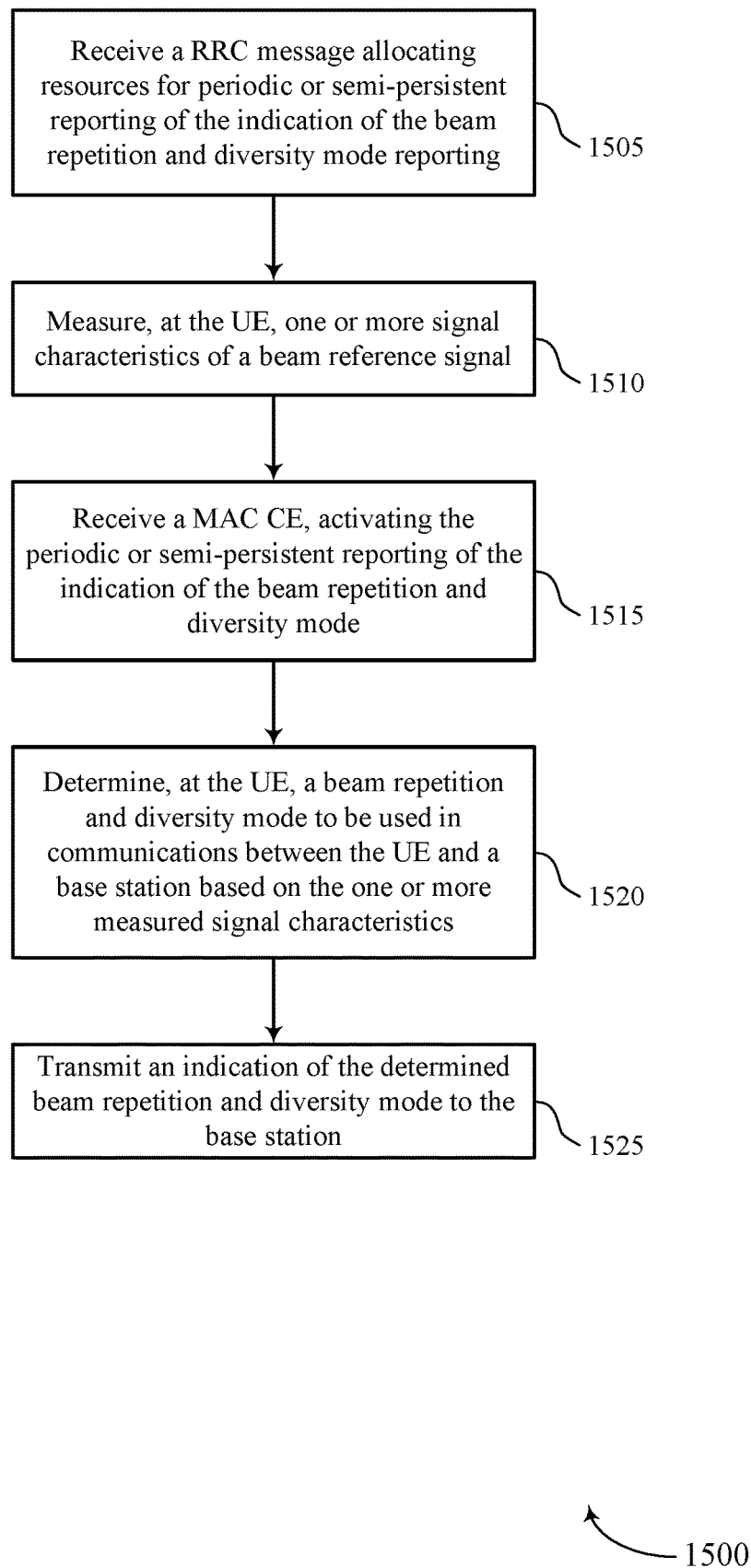

FIG. 15 shows a flowchart illustrating a method 1500 that supports feedback of a beam R/D mode in accordance with aspects of the present disclosure. The operations of method 1500 may be implemented by a UE 115 or its components as described herein. For example, the operations of method 1500 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1505, the UE may receive a RRC message allocating resources for periodic or semi-persistent reporting of the indication of the beam R/D mode reporting. The operations of 1505 may be performed according to the methods described herein. In some examples, aspects of the operations of 1505 may be performed by a UE feedback manager as described with reference to FIGS. 4 to 7.

At 1510, the UE may measure, at the UE, one or more signal characteristics of a beam reference signal. The operations of 1510 may be performed according to the methods described herein. In some examples, aspects of the operations of 1510 may be performed by a RS manager as described with reference to FIGS. 4 to 7.

At 1515, the UE may receive a MAC-CE, activating the periodic or semi-persistent reporting of the indication of the beam R/D mode. The operations of 1515 may be performed according to the methods described herein. In some examples, aspects of the operations of 1515 may be performed by a UE feedback manager as described with reference to FIGS. 4 to 7.

At 1520, the UE may determine, at the UE, a beam R/D mode to be used in communications between the UE and a base station based on the one or more measured signal characteristics. The operations of 1520 may be performed according to the methods described herein. In some examples, aspects of the operations of 1520 may be performed by a beam R/D mode manager as described with reference to FIGS. 4 to 7.

At 1525, the UE may transmit an indication of the determined beam R/D mode to the base station. The operations of 1525 may be performed according to the methods described herein. In some examples, aspects of the operations of 1525 may be performed by a UE feedback manager as described with reference to FIGS. 4 to 7.

Figure 16:
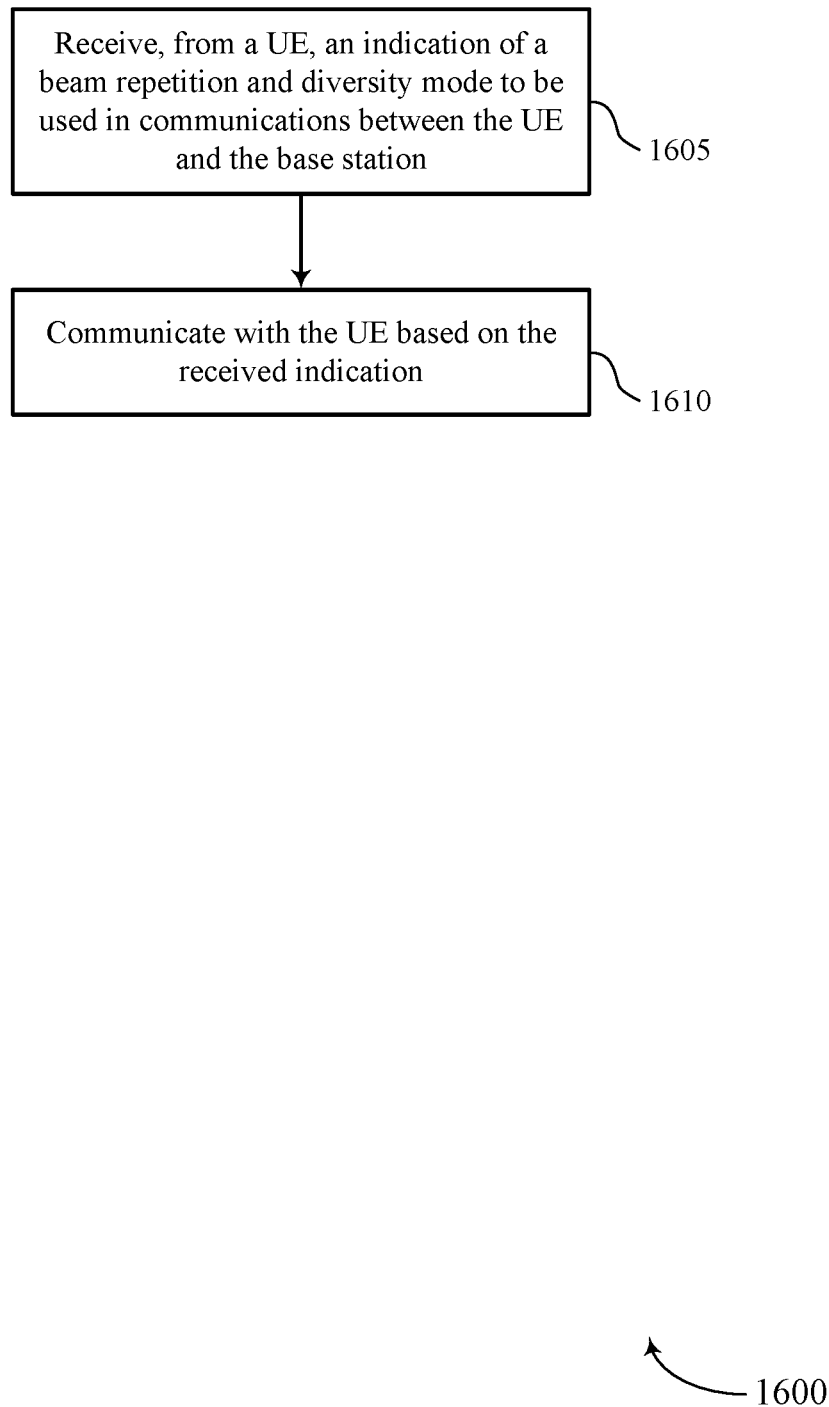

FIG. 16 shows a flowchart illustrating a method 1600 that supports feedback of a beam R/D mode in accordance with aspects of the present disclosure. The operations of method 1600 may be implemented by a base station 105 or its components as described herein. For example, the operations of method 1600 may be performed by a communications manager as described with reference to FIGS. 8 to 11. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE, an indication of a beam R/D mode to be used in communications between the UE and the base station. The operations of 1605 may be performed according to the methods described herein. In some examples, aspects of the operations of 1605 may be performed by a UE feedback manager as described with reference to FIGS. 8 to 11.

At 1610, the base station may communicate with the UE based on the received indication. The operations of 1610 may be performed according to the methods described herein. In some examples, aspects of the operations of 1610 may be performed by a beam R/D mode manager as described with reference to FIGS. 8 to 11.

Figure 17:
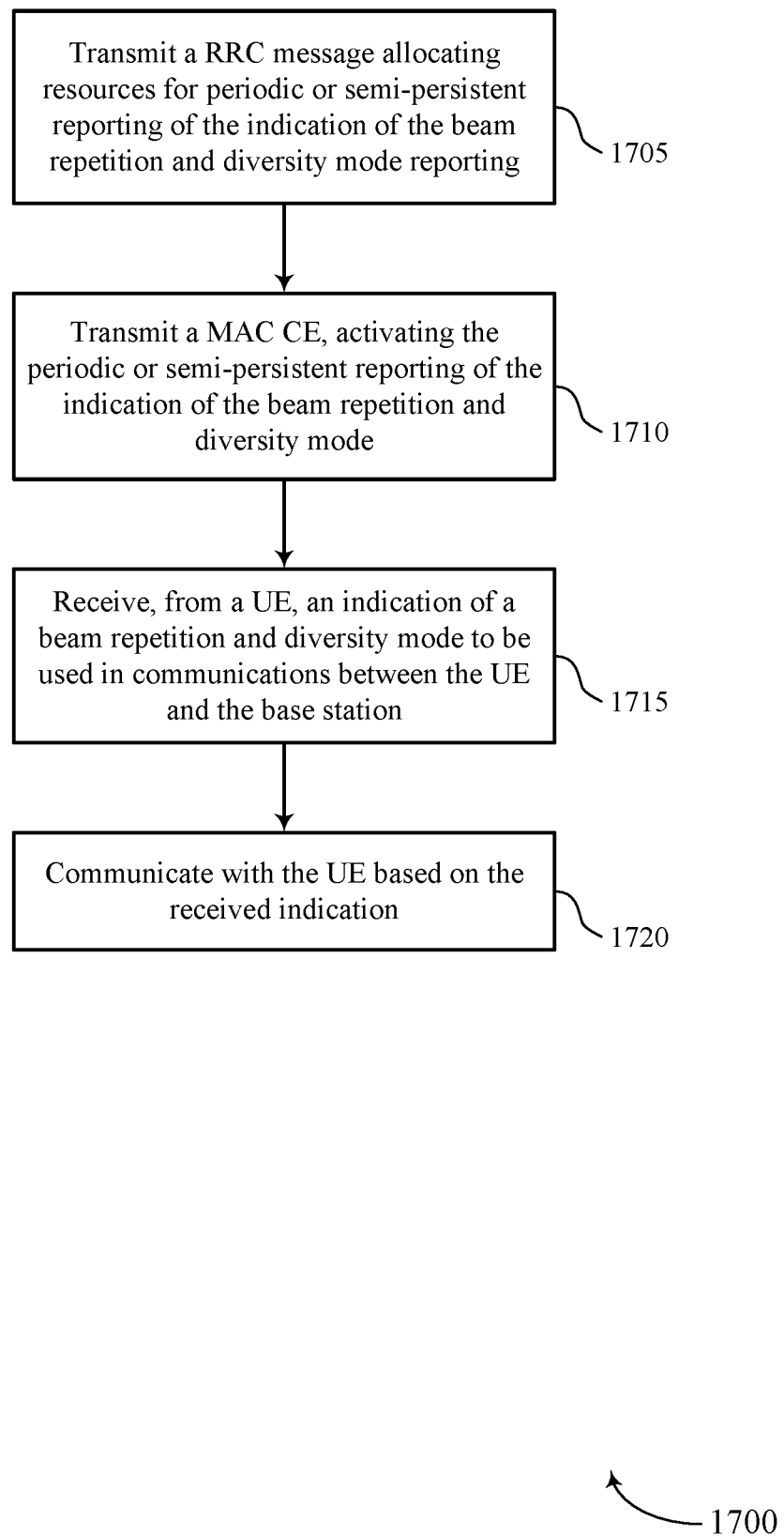

FIG. 17 shows a flowchart illustrating a method 1700 that supports feedback of a beam R/D mode in accordance with aspects of the present disclosure. The operations of method 1700 may be implemented by a base station 105 or its components as described herein. For example, the operations of method 1700 may be performed by a communications manager as described with reference to FIGS. 8 to 11. In some examples, a base station may execute a set of instructions to control the functional elements of the base station to perform the functions described herein. Additionally or alternatively, a base station may perform aspects of the functions described herein using special-purpose hardware.

At 1705, the base station may transmit a RRC message allocating resources for periodic or semi-persistent reporting of the indication of the beam R/D mode reporting. The operations of 1705 may be performed according to the methods described herein. In some examples, aspects of the operations of 1705 may be performed by a beam R/D mode manager as described with reference to FIGS. 8 to 11.

At 1710, the base station may transmit a MAC-CE, activating the periodic or semi-persistent reporting of the indication of the beam R/D mode. The operations of 1710 may be performed according to the methods described herein. In some examples, aspects of the operations of 1710 may be performed by a beam R/D mode manager as described with reference to FIGS. 8 to 11.

At 1715, the base station may receive, from a UE, an indication of a beam R/D mode to be used in communications between the UE and the base station. The operations of 1715 may be performed according to the methods described herein. In some examples, aspects of the operations of 1715 may be performed by a UE feedback manager as described with reference to FIGS. 8 to 11.

At 1720, the base station may communicate with the UE based on the received indication. The operations of 1720 may be performed according to the methods described herein. In some examples, aspects of the operations of 1720 may be performed by a beam R/D mode manager as described with reference to FIGS. 8 to 11.

Figure 18:
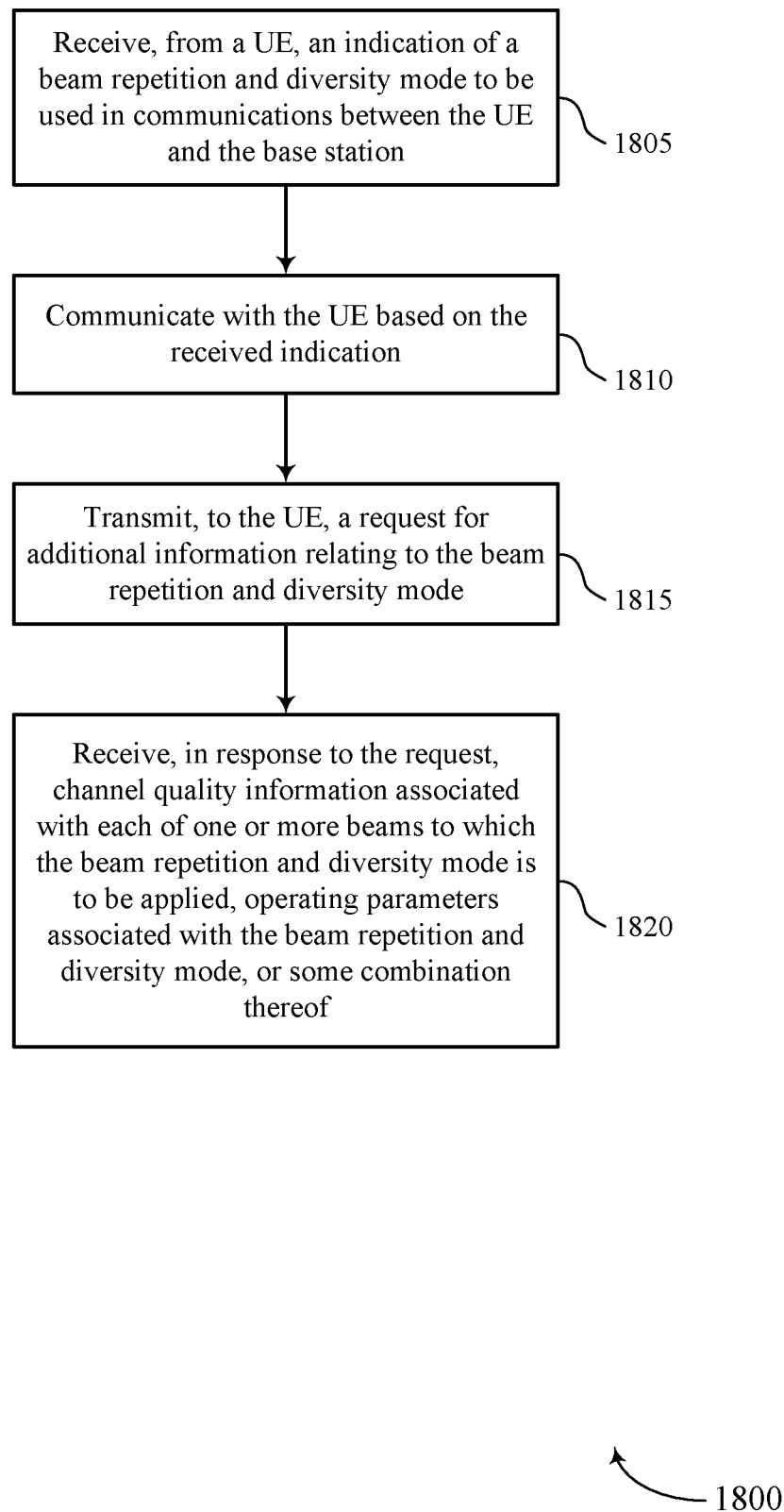

FIG. 18 shows a flowchart illustrating a method 1800 that supports feedback of a beam R/D mode in accordance with aspects of the present disclosure. The operations of method 1800 may be implemented by a base station 105 or its components as described herein. For example, the operations of method 1800 may be performed by a communications manager as described with reference to FIGS. 8 to 11. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, an indication of a beam R/D mode to be used in communications between the UE and the base station. The operations of 1805 may be performed according to the methods described herein. In some examples, aspects of the operations of 1805 may be performed by a UE feedback manager as described with reference to FIGS. 8 to 11.

At 1810, the base station may communicate with the UE based on the received indication. The operations of 1810 may be performed according to the methods described herein. In some examples, aspects of the operations of 1810 may be performed by a beam R/D mode manager as described with reference to FIGS. 8 to 11.

At 1815, the base station may transmit, to the UE, a request for additional information relating to the beam R/D mode. The operations of 1815 may be performed according to the methods described herein. In some examples, aspects of the operations of 1815 may be performed by a beam R/D mode manager as described with reference to FIGS. 8 to 11.

At 1820, the base station may receive, in response to the request, channel quality information associated with each of one or more beams to which the beam R/D mode is to be applied, operating parameters associated with the beam R/D mode, or some combination thereof. The operations of 1820 may be performed according to the methods described herein. In some examples, aspects of the operations of 1820 may be performed by a UE feedback manager as described with reference to FIGS. 8 to 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   measuring, at the UE, one or more signal characteristics of a beam reference signal;
   determining, at the UE, a beam repetition and diversity mode to be used in communications between the UE and a base station based at least in part on the one or more measured signal characteristics;
   transmitting, to the base station, a scheduling request for indicating the determined beam repetition and diversity mode;
   receiving, from the base station based at least in part on transmitting the scheduling request, a request that an indication of the determined beam repetition and diversity mode be transmitted to the base station; and
   transmitting, to the base station in response to receiving the request, the indication of the determined beam repetition and diversity mode.

2. The method of claim 1, wherein transmitting the scheduling request comprises:
   transmitting the scheduling request in a physical uplink control channel, a physical uplink shared channel, or in a random-access request procedure.

3. The method of claim 1, further comprising:
   receiving, from the base station, a request for additional information relating to the determined beam repetition and diversity mode; and
   transmitting, based at least in part on receiving the request for additional information, channel quality information associated with each of one or more beams to which the determined beam repetition and diversity mode is to be applied, operating parameters associated with the beam repetition and diversity mode, or some combination thereof.

4. The method of claim 3, wherein the operating parameters include a number of beam repetitions for each of the one or more beams, beam indices associated with the one or more beams, a transmissions order associated with the one or more beams, a mixed beam repetition and diversity pattern, or some combination thereof.

5. The method of claim 3, further comprising:
   determining the operating parameters associated with the beam repetition and diversity mode based at least in part on the measured one or more signal characteristics of the beam reference signal.

6. The method of claim 1, wherein transmitting the indication of the determined beam repetition and diversity mode comprises:
   including the indication of the determined beam repetition and diversity mode in a beam management report; and
   transmitting the beam management report to the base station.

7. The method of claim 1, wherein transmitting the indication of the determined beam repetition and diversity mode comprises:
   including the indication of the determined beam repetition and diversity mode in a beam failure recovery (BFR) request, wherein the determined beam repetition and diversity mode is associated with a candidate beam in a BFR procedure; and
   transmitting the BFR request to the base station.

8. The method of claim 1, further comprising:
   receiving a radio resource control (RRC) message allocating resources for periodic or semi-persistent reporting of the indication of the beam repetition and diversity mode reporting.

9. The method of claim 8, further comprising:
   receiving a media access control (MAC) control element (CE), activating the periodic or semi-persistent reporting of the indication of the beam repetition and diversity mode.

10. The method of claim 1, wherein transmitting the scheduling request comprises:
    identifying, at the UE, that a beam repetition and diversity mode reporting criteria is satisfied; and transmitting the scheduling request based at least in part on the beam repetition and diversity mode reporting criteria being satisfied.

11. The method of claim 10, further comprising:
identifying the beam repetition and diversity mode reporting criteria is satisfied based at least in part on identifying that a duration of time since a previous beam management report has been transmitted exceeds a threshold, identifying a second beam repetition and diversity mode for a beam associated with the beam reference signal, or some combination thereof.

12. The method of claim 1, wherein transmitting the indication of the determined beam repetition and diversity mode to the base station comprises:
transmitting the indication on a dedicated resource or piggybacked with a periodic, semi-persistent, or aperiodic beam management report.

13. The method of claim 1, wherein transmitting the indication of the determined beam repetition and diversity mode to the base station comprises:
transmitting the indication piggybacked with uplink data or included in a dedicated uplink frame scheduled by an uplink grant triggered by the scheduling request.

14. The method of claim 1, wherein determining the beam repetition and diversity mode comprises:
selecting from a beam repetition mode, a beam diversity mode, a mixed beam repetition and diversity mode, or a no beam repetition and diversity mode, and wherein the indication of the determined beam repetition and diversity mode includes a 2-bit indicator that indicates the selected beam repetition and diversity mode.

15. An apparatus for wireless communications at a user equipment (UE), comprising:
a processor,
memory coupled with the processor; and
instructions stored in the memory and executable by the processor to cause the apparatus to:
measure, at the UE, one or more signal characteristics of a beam reference signal;
determine, at the UE, a beam repetition and diversity mode to be used in communications between the UE and a base station based at least in part on the one or more measured signal characteristics;
transmit, to the base station, a scheduling request for indicating the determined beam repetition and diversity mode;
receive, from the base station based at least in part on transmitting the scheduling request, a request that an indication of the determined beam repetition and diversity mode be transmitted to the base station; and
transmit, to the base station in response to receiving the request, the indication of the determined beam repetition and diversity mode.

16. The apparatus of claim 15, wherein the instructions to transmit the scheduling request are executable by the processor to cause the apparatus to:
transmit the scheduling request in a physical uplink control channel, a physical uplink shared channel, or in a random-access request procedure.

17. The apparatus of claim 15, wherein the instructions are further executable by the processor to cause the apparatus to:
receive, from the base station, a request for additional information relating to the determined beam repetition and diversity mode; and
transmit, based at least in part on receiving the request for additional information, channel quality information associated with each of one or more beams to which the determined beam repetition and diversity mode is to be applied, operating parameters associated with the beam repetition and diversity mode, or some combination thereof.

18. The apparatus of claim 17, wherein: the operating parameters include a number of beam repetitions for each of the one or more beams, beam indices associated with the one or more beams, a transmissions order associated with the one or more beams, a mixed beam repetition and diversity pattern, or some combination thereof.

19. The apparatus of claim 17, wherein the instructions are further executable by the processor to cause the apparatus to:
determine the operating parameters associated with the beam repetition and diversity mode based at least in part on the measured one or more signal characteristics of the beam reference signal.

20. The apparatus of claim 15, wherein the instructions to transmit the indication of the determined beam repetition and diversity mode are executable by the processor to cause the apparatus to:
include the indication of the determined beam repetition and diversity mode in a beam management report; and
transmit the beam management report to the base station.

21. The apparatus of claim 15, wherein the instructions to transmit the indication of the determined beam repetition and diversity mode are executable by the processor to cause the apparatus to:
include the indication of the determined beam repetition and diversity mode in a beam failure recovery (BFR) request, wherein the determined beam repetition and diversity mode is associated with a candidate beam in a BFR procedure; and
transmit the BFR request to the base station.

22. The apparatus of claim 15, wherein the instructions are further executable by the processor to cause the apparatus to:
receive a radio resource control (RRC) message allocating resources for periodic or semi-persistent reporting of the indication of the beam repetition and diversity mode reporting.

23. The apparatus of claim 22, wherein the instructions are further executable by the processor to cause the apparatus to:
receive a media access control (MAC) control element (CE), activating the periodic or semi-persistent reporting of the indication of the beam repetition and diversity mode.

24. The apparatus of claim 15, wherein the instructions to transmit the scheduling request are executable by the processor to cause the apparatus to:
identify, at the UE, that a beam repetition and diversity mode reporting criteria is satisfied; and
transmit the schedule request based at least in part on the beam repetition and diversity mode reporting criteria being satisfied.

25. The apparatus of claim 24, wherein the instructions are further executable by the processor to cause the apparatus to:
identify the beam repetition and diversity mode reporting criteria is satisfied based at least in part on identifying that a duration of time since a previous beam management report has been transmitted exceeds a threshold, identifying a second beam repetition and diversity mode for a beam associated with the beam reference signal, or some combination thereof.

26. The apparatus of claim 15, wherein the instructions to transmit the indication of the determined beam repetition and diversity mode to the base station are executable by the processor to cause the apparatus to:
  transmit the indication on a dedicated resource or piggybacked with a periodic, semi-persistent, or aperiodic beam management report.

27. The apparatus of claim 15, wherein the instructions to transmit the indication of the determined beam repetition and diversity mode to the base station are executable by the processor to cause the apparatus to:
  transmit the indication piggybacked with uplink data or included in a dedicated uplink frame scheduled by an uplink grant triggered by the scheduling request.

28. An apparatus for wireless communications at a user equipment (UE), comprising:
  means for measuring, at the UE, one or more signal characteristics of a beam reference signal;
  means for determining, at the UE, a beam repetition and diversity mode to be used in communications between the UE and a base station based at least in part on the one or more measured signal characteristics;
  means for transmitting, to the base station, a scheduling request for indicating the determined beam repetition and diversity mode;
  means for receiving, from the base station based at least in part on transmitting the scheduling request, a request that an indication of the determined beam repetition and diversity mode be transmitted to the base station; and
  means for transmitting, to the base station in response to receiving the request, the indication of the determined beam repetition and diversity mode.

29. The apparatus of claim 28, wherein the means for transmitting the scheduling request comprises:
  means for transmitting the scheduling request in a physical uplink control channel, a physical uplink shared channel, or in a random-access request procedure.

30. A non-transitory computer-readable medium storing code for wireless communications at a user equipment (UE), the code comprising instructions executable by a processor to:
  measure, at the UE, one or more signal characteristics of a beam reference signal;
  determine, at the UE, a beam repetition and diversity mode to be used in communications between the UE and a base station based at least in part on the one or more measured signal characteristics;
  transmit, to the base station, a scheduling request for indicating the determined beam repetition and diversity mode;
  receive, from the base station based at least in part on transmitting the scheduling request, a request that an indication of the determined beam repetition and diversity mode be transmitted to the base station; and
  transmit, to the base station in response to receiving the request, the indication of the determined beam repetition and diversity mode.

* * * * *